United States Patent [19]

Stiepel et al.

[11] Patent Number: 5,394,209
[45] Date of Patent: Feb. 28, 1995

[54] SURVEILLANCE DEVICE WITH EYEBALL ASSEMBLY AND PIVOTABLY MOUNTABLE CARRIAGE ASSEMBLY

[75] Inventors: Norbert M. Stiepel, Coral Springs; Luis Anderson, Boca Raton; Edwin S. Thompson, Loxahatchee, all of Fla.

[73] Assignee: Sensormatic Electronics Corporation, Deerfield Beach, Fla.

[21] Appl. No.: 187,811

[22] Filed: Jan. 27, 1994

Related U.S. Application Data

[63] Continuation of Ser. No. 761,331, Sep. 17, 1991, abandoned.

[51] Int. Cl.⁶ .............................................. G03B 29/00
[52] U.S. Cl. ..................................... 354/81; 354/288; 348/151
[58] Field of Search ............... 354/81, 288; 439/15; 348/143-156

[56] References Cited

U.S. PATENT DOCUMENTS

| | | | |
|---|---|---|---|
| 894,348 | 7/1908 | Seele | 354/81 |
| 1,641,301 | 9/1927 | Sperry | 354/81 |
| 3,535,442 | 10/1970 | Jennings | 178/15 |
| 3,720,147 | 3/1973 | Bemis | 354/81 |
| 3,732,368 | 5/1973 | Mahlab | 178/15 |
| 3,739,703 | 6/1973 | Behles | 354/81 |
| 3,819,856 | 6/1974 | Pearl, deceased et al. | 178/15 |
| 3,916,097 | 10/1975 | Imai | 178/15 |
| 3,935,380 | 1/1976 | Coutta | 178/15 |
| 4,080,629 | 3/1978 | Hammond et al. | 358/229 |
| 4,120,004 | 10/1978 | Coutta | 358/108 |
| 4,160,999 | 7/1979 | Claggett | 358/108 |
| 4,225,881 | 9/1980 | Tovi | 358/108 |
| 4,320,949 | 3/1982 | Pagano | 354/81 |
| 4,510,526 | 4/1985 | Coutta et al. | 358/108 |
| 4,736,218 | 4/1988 | Kutman | 354/81 |
| 4,824,396 | 4/1989 | Sasaki et al. | 439/475 |
| 4,833,534 | 5/1989 | Paff et al. | 358/108 |
| 4,855,823 | 8/1989 | Struhs et al. | 358/108 |
| 4,901,146 | 2/1990 | Struhs et al. | 358/108 |
| 4,918,473 | 4/1990 | Blackshear | 354/81 |
| 4,927,365 | 5/1990 | Schauer et al. | 439/15 |
| 4,945,367 | 7/1990 | Blackshear | 354/81 |
| 5,121,215 | 6/1992 | Boers et al. | 358/229 |
| 5,153,623 | 10/1992 | Bouvier | 354/81 |

*Primary Examiner*—David M. Gray
*Attorney, Agent, or Firm*—Robin, Blecker, Daley & Driscoll

[57] ABSTRACT

A surveillance assembly in which a camera and lens assembly is surrounded by a shroud to form an eyeball assembly which is rotatable about first and second axes and which is enclosed within a housing. A carriage assembly for mounting the eyeball assembly to the housing is provided in the surveillance assembly and includes pivot and engagement parts which allow the carriage assembly to be pivoted into position. Additionally disclosed is a camera/lens mounting with a resilient annular member for permitting adjustment of the mounting along the lens axis and a cable support assembly for an electrical cable connected between a camera lens assembly and another part of a surveillance assembly in which the cable support assembly permits the cable to be wound about the pivot axis of the camera and lens assembly.

82 Claims, 13 Drawing Sheets

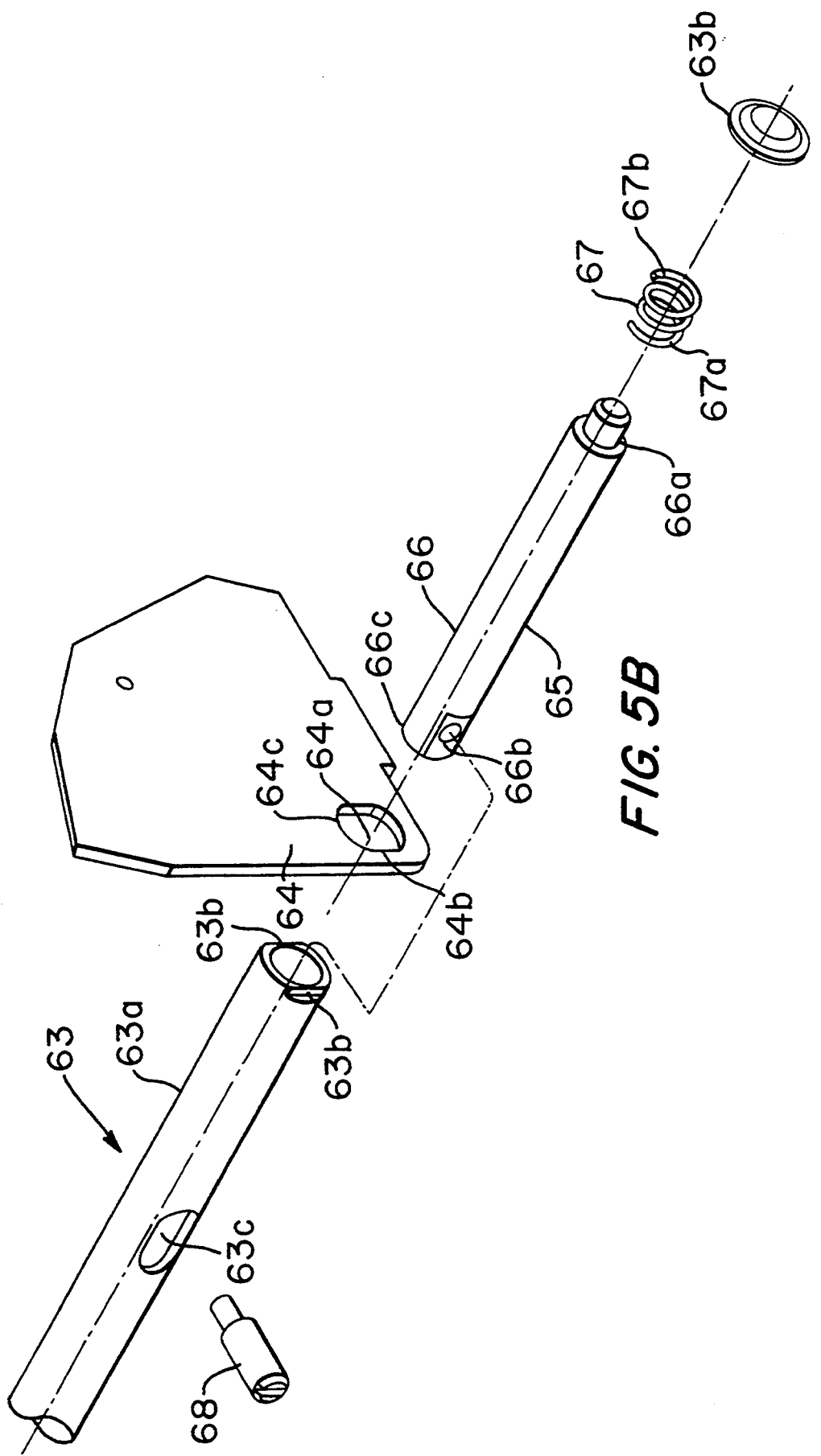

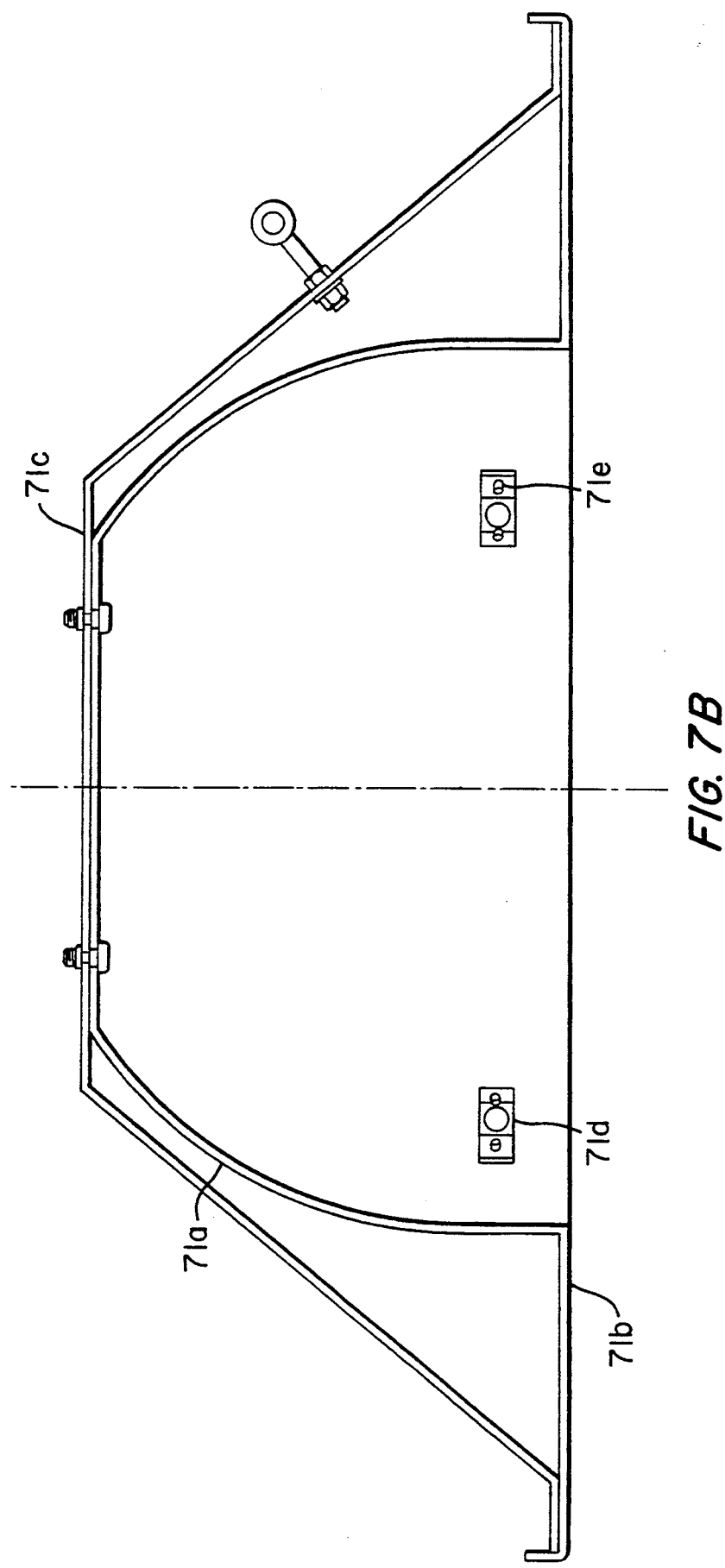

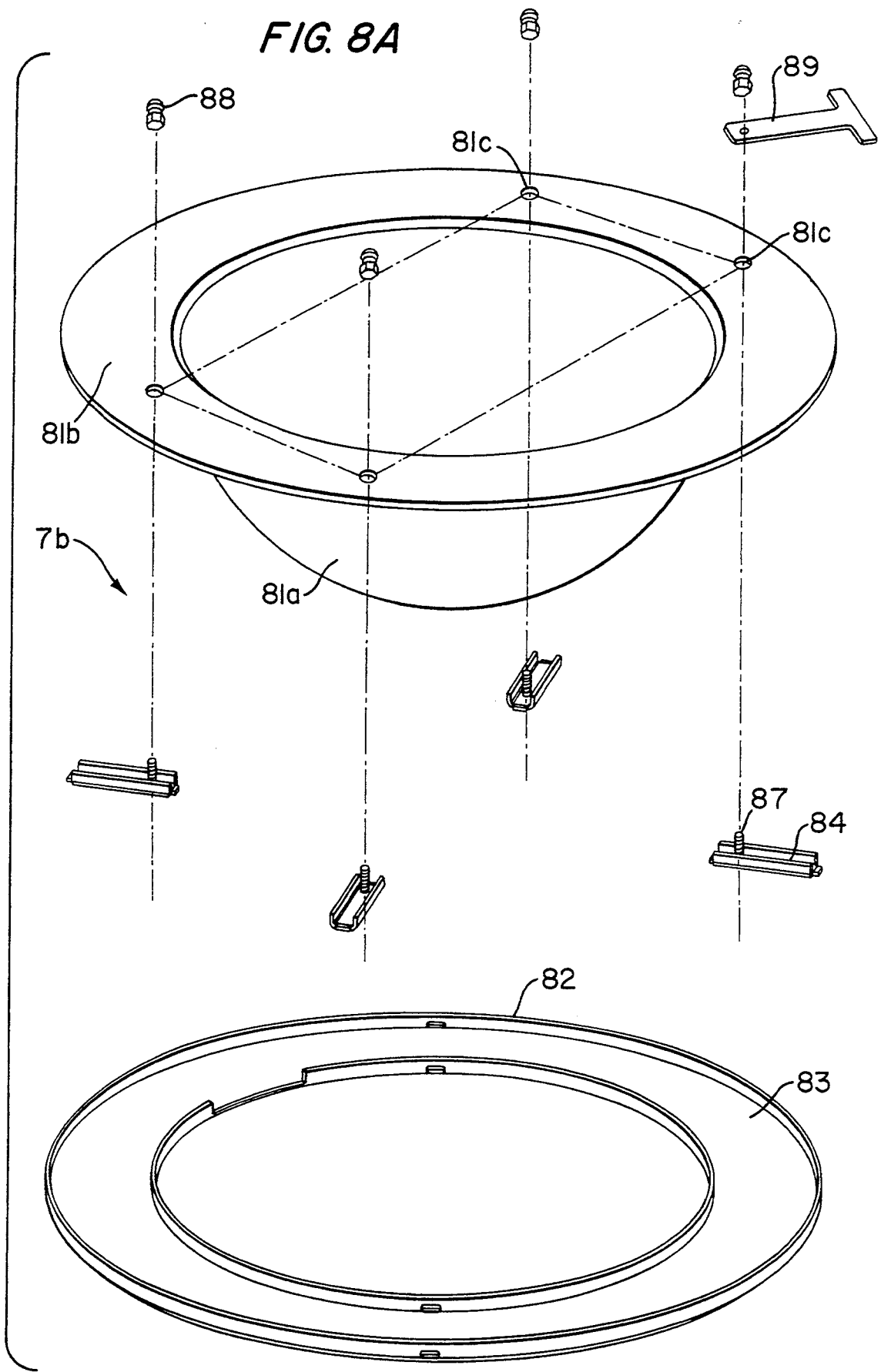

SURVEILLANCE DEVICE WITH EYEBALL ASSEMBLY AND PIVOTABLY MOUNTABLE CARRIAGE ASSEMBLY

This is a continuation application under 37 CFR 1.62 of prior application Ser. No. 07/761,331, filed Sep. 17, 1991, abandoned.

BACKGROUND OF THE INVENTION

This invention relates to a surveillance device and, in particular, to a surveillance device which employs a camera and lens assembly.

A type of surveillance device is known in the art in which a camera and lens assembly is utilized in the surveillance device to permit the device to view the location being placed under surveillance. The surveillance device is provided with a housing for housing the camera and lens assembly. A typical housing includes an upper support section which may be dome-shaped and from which the camera and lens assembly is suspended. A lower section, which may also be domed-shaped, abuts the upper section to complete the housing and fully enclose the camera and lens assembly. The lower section is also light transmissive to permit viewing by the camera and lens assembly outward of the housing.

In the above-type of surveillance device, the lens and camera assembly is carried by a mounting member which is coupled to the support section of the housing so as to be rotational about a first axis, usually a vertical axis. The lens and camera assembly is furthermore supported on the mounting member such that the assembly itself is rotatable about a second axis, usually a horizontal axis. In this way, by rotation of the mounting member and rotation of the camera and lens assembly, the latter can be moved in a horizontal plane and a vertical plane, respectively, to provide the so-called "panning" and "tilting" motion of the assembly. This, in turn, provides the desired viewing coverage of the location under surveillance.

Also employed in some surveillance devices of this type is an opaque or non-light-transmissive enclosure or shroud. This shroud is affixed to and rotates with the mounting member and extends between the lower housing section and the camera and lens assembly. The shroud thus shields the camera and lens assembly, making the assembly difficult to observe through the light-transmissive housing section. This prevents a subject under surveillance from readily removing himself or herself from the camera field of view.

The above use of a shroud in a surveillance device requires that the shroud be provided with an elongated, vertical slot. This slot permits the camera and lens assembly to view outward of the shroud over the extent of the tilting motion of the assembly. However, the presence of the slot also permits viewing of the camera and lens assembly through the slot from certain viewing angles. This detracts from the desired shielding function of the shroud.

In U.S. Pat. No. 4,833,534, assigned to the same assignee hereof, an additional non-light-transmissive shutter is provided in the surveillance device to mitigate against the undesired effects of the slot. This shutter is arranged to move with the tilting motion of the camera and lens assembly so as to fill or occupy the region of the slot not blocked by the assembly itself. While the presence of the shutter substantially prevents viewing of the camera and lens assembly through the slot, it also requires the use of an additional moving part and the coordinating of the movement of this part with the tilting movement of the camera and lens assembly.

In the above-type surveillance device, it has also been customary to bolt the mounting member carrying the camera and lens assembly to the upper support section of the housing. This has made installation and servicing of the camera and lens assembly time consuming and difficult, particularly in overhead or ceiling installations. Accordingly, designs are being sought for the mounting member which enable the member to be installed and removed more quickly and with less effort. One such design is disclosed in U.S. Pat. No. 4,945,367, in which the mounting member is provided with slots which are received by depending pins situated in the support section of the housing. By twisting the mounting member, the slots become locked to the pins so that the desired connection of the mounting member to the support housing is realized.

The above arrangement of the '367 patent, however, still requires alignment of several slots in the mounting member with corresponding pins in the support housing. This alignment procedure can be a difficult process, particularly when the weight of the camera and lens assembly is considered and the installation is overhead.

In the above-type surveillance devices, the camera and lens assembly usually comprises a camera/lens mounting for coupling the lens of the assembly to the camera image pick-up unit of the assembly. The image pick-up unit may or may not have attached to it the remainder of the camera body, depending upon certain length requirements of the surveillance device.

In a typical camera/lens mounting, the mounting is adapted to engage a cylindrical collar at the back end of the lens. This collar has an annular slot which receives a first wider cylindrical end of a shouldered member, referred to as a "C-mount", which forms a part of the camera/lens mounting A narrower second cylindrical end of the shouldered C-mount is then adapted via a threaded section to receive the threaded front end of the image pick-up unit.

In order to hold the C-mount in place, the camera/lens mounting is further provided with a locking ring or nut. This nut has an inner surface which bears against the shoulder of the C-mount as the ring is locked to the collar via internal threads which mate with external threads on the collar.

In the above camera and lens assembly, once the pick-up unit is locked to the lens via the camera/lens mounting, it may be necessary to adjust the position of the image pickup relative to focal point of the lens. This is presently accomplished by an adjusting mechanism included in the image pick-up unit which allows preselected movement of the components of the unit. This adjusting mechanism is often of complicated mechanical design and, therefore, other techniques for making this so-called "back-focus" adjustment are being sought.

It is, therefore, an object of the present invention to provide a surveillance device in which the security of the device is better preserved.

It is a further object of the present invention to provide a surveillance device in which enhanced shielding of the camera and lens assembly of the surveillance device is realized.

It is also an object of the present invention to provide a surveillance device in which the installation and removal of the camera and lens assembly is made easier and quicker.

It is yet a further object of the present invention to provide a camera/lens mounting for the camera and lens assembly of a surveillance device which allows for easier adjustment of the camera image pick-up unit relative to the lens of the assembly.

SUMMARY OF THE INVENTION

In accordance with the principles of the present invention, the above and other objectives are realized in part in a surveillance device of the above-type in which a shroud is provided in the surveillance device and is arranged to substantially totally surround and move with the camera and lens assembly. The shroud is itself provided with a light-transmissive area aligned with the viewing direction of the camera and lens assembly and of sufficient extent to pass the viewing cone of the assembly. The shroud thus forms with the camera and lens assembly an eyeball assembly.

The eyeball assembly is adapted to itself be mounted within the housing of the surveillance device such as to allow rotational movement of the eyeball assembly about first and second axes. This enables panning and tilting of the eyeball assembly and, therefore, the viewing axis of the camera and lens assembly.

With this configuration for the surveillance device, the camera and lens assembly is totally shielded or blocked from view by the shroud of the eyeball assembly, making it extremely difficult to detect the direction in which the lens assembly is viewing. Also, since the shroud and camera and lens assembly move together as the eyeball assembly, the need to coordinate additional movable parts to effect shielding is avoided.

In the embodiment of the invention to be disclosed hereinafter, the eyeball assembly is provided with a mounting member which is within the shroud and to which the camera and lens assembly and the shroud are mounted. The mounting member is adapted to be rotational about the first and second axes so as to provide this rotational movement to the eyeball assembly.

A carriage assembly is also provided for connecting the eyeball assembly to the support section of the surveillance device housing. The carriage assembly includes a support means which is rotational about the first axis and which engages the mounting member of the eyeball assembly through a coupling means. The coupling means permits the mounting member to be rotational about the second axis relative to the support means while it causes the mounting member to rotate about the first axis with the support means. The support means is in the form of a yoke having spaced arms which engage individual couplings of the coupling means attached to opposing parts of the mounting member.

In a further aspect of the invention, the carriage assembly of the surveillance device is provided with a pivot means adapted to pivotably engage a first surface area of the support section of the surveillance device housing. The carriage assembly is also provided with an engagement means adapted to engage a second surface area of the housing as the carriage assembly is pivoted via the pivot means relative to the first surface area. In this way, the carriage assembly is brought into supporting engagement with the first and second surface areas of the housing support section so that the carriage assembly and the carried eyeball assembly become supported thereby.

In the disclosed embodiment, the pivot means and engagement means comprise respective first and second elongated members arranged along opposing sides of the carriage assembly. These members are provided with ends adapted to seat in respective slotted seating regions defining the first and second surface areas of the housing support section. Additionally, these members are adapted such that their respective ends can be moved toward and away from each other. As a result, the ends of each member can be moved toward each other during alignment with their respective slotted seating regions and then moved away from each other to seat them in these regions.

Adapting the elongated members to provide this movement is through a biasing means which urges or forces the ends of a member apart. A further means is then provided for reducing the bias provided by the biasing means so the ends of a member can be brought together.

In yet a further aspect of the invention, a camera/lens mounting for the camera and lens assembly is provided. This mounting includes a shouldered tubular member, a locking and adjusting ring and an annular resilient means in the form of an undulating or wavy annular member or washer. The resilient means is situated in the slot of the lens collar between the lens and the shouldered member and allows for positive, but adjustable, locking of the shouldered member to the lens when the locking ring is attached to the collar. The shouldered member can thus be moved controllably axially permitting adjustment of the member and the attached image pick-up relative to the lens focal point.

In still yet a further aspect of the invention, the electrical cable connecting the camera and lens assembly to the carriage assembly is wound about the second axis to promote compactness and avoid entanglement.

BRIEF DESCRIPTION OF THE DRAWINGS

The above and other features and aspects of the present invention will become more apparent upon reading the following detailed description in conjunction with the accompanying drawings, in which:

FIG. 5B shows in greater detail a part of the pivot and engagement assembly of the carriage assembly of FIG. 5A;

FIGS. 7A–7C show various views of the housing support section of the housing of the surveillance device of FIG. 1;

FIGS. 8A and 8B show various views of the housing cover section of the housing of the surveillance device of FIG. 1.

DETAILED DESCRIPTION

Figure 1:
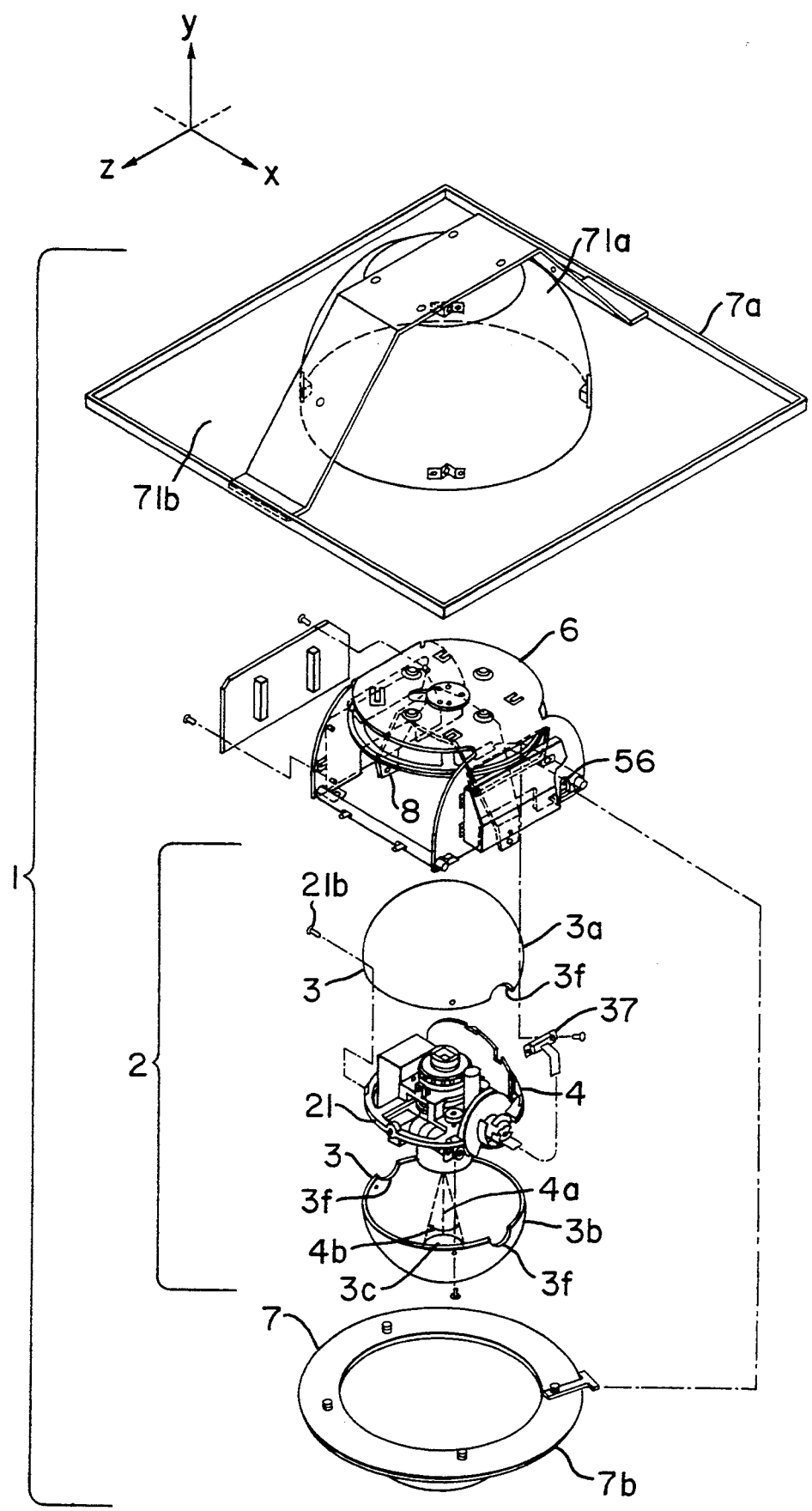
FIG. 1 shows an exploded view of a surveillance device in accordance with the principles of the present invention.

FIG. 1 shows a surveillance device 1 in accordance with the principles of the present invention. The device 1 comprises an eyeball assembly 2, a carriage assembly 6 for carrying the eyeball assembly 2 and a housing 7 for supporting and enclosing the eyeball and carriage assemblies.

The eyeball assembly 2 is itself formed from a shroud 3 and a lens and camera assembly 4. The shroud 3 comprises abutting non-light-transmissive hemispherical shells 3a and 3b which together form a hollow sphere which substantially totally surrounds the lens and camera assembly 4. The shells 3a and 3b are held in abutting relationship by connecting the shells, via screws 21b, to the periphery of a mounting member 21 of the camera and lens assembly 4.

To permit the camera and lens assembly 4 to view outward of the spherical shroud 3, the shell 3b is provided with a light-transmissive view aperture 3c. The latter aperture aligns with the viewing axis 4a and is just sufficient to pass the viewing cone 4b of the camera and lens assembly. The assembly 4 can thus view outward of the shroud 3, while otherwise being totally shielded by the shroud.

The shielding effect of the shroud 3 can be further enhanced by suitably adapting the outer surfaces of the shells 3a and 3b to make them less observable. Preferably, these surfaces may be made reflective to light in the same manner as the glass surface of the objective lens 4c of the camera and lens assembly 4. This can be accomplished by painting the surfaces with a material which simulates the reflectivity of the lens glass. Alternatively, the outer surfaces of the shells, instead of being made reflective, can be made non-reflective by making them opaque or black.

The carriage assembly 6 carries the eyeball assembly 2 such that the entire eyeball assembly is able to rotate about first and second orthogonal axes, shown as the y-axis and x-axis, respectively, in FIG. 1. The carriage assembly 6, in turn, is fixedly mounted to a top or housing support section 7a of the housing 7. When the carriage assembly is so mounted, the eyeball assembly 2 extends into a housing cover section 7b of the housing. The section 7b abuts the top housing section 7a so as to totally enclose the carriage and eyeball assemblies. The bottom section 7b is further made of a light-transmissive material, typically a clear acrylic, so as to permit the eyeball assembly to view out of the housing 7.

As above-indicated, the entire eyeball assembly is adapted to rotate about the x-axis and the y-axis, i.e., to undergo pivoting and panning motion, to bring the viewing axis 4a and viewing cone 4b of the camera and lens assembly 4 to various positions. As can be appreciated, during this pivoting and panning motion, the presence of the shroud 3 substantially eliminates the ability to observe the direction in which the camera and lens assembly 4 is pointing. Accordingly, avoiding the view of the camera is made more difficult.

Figure 2:
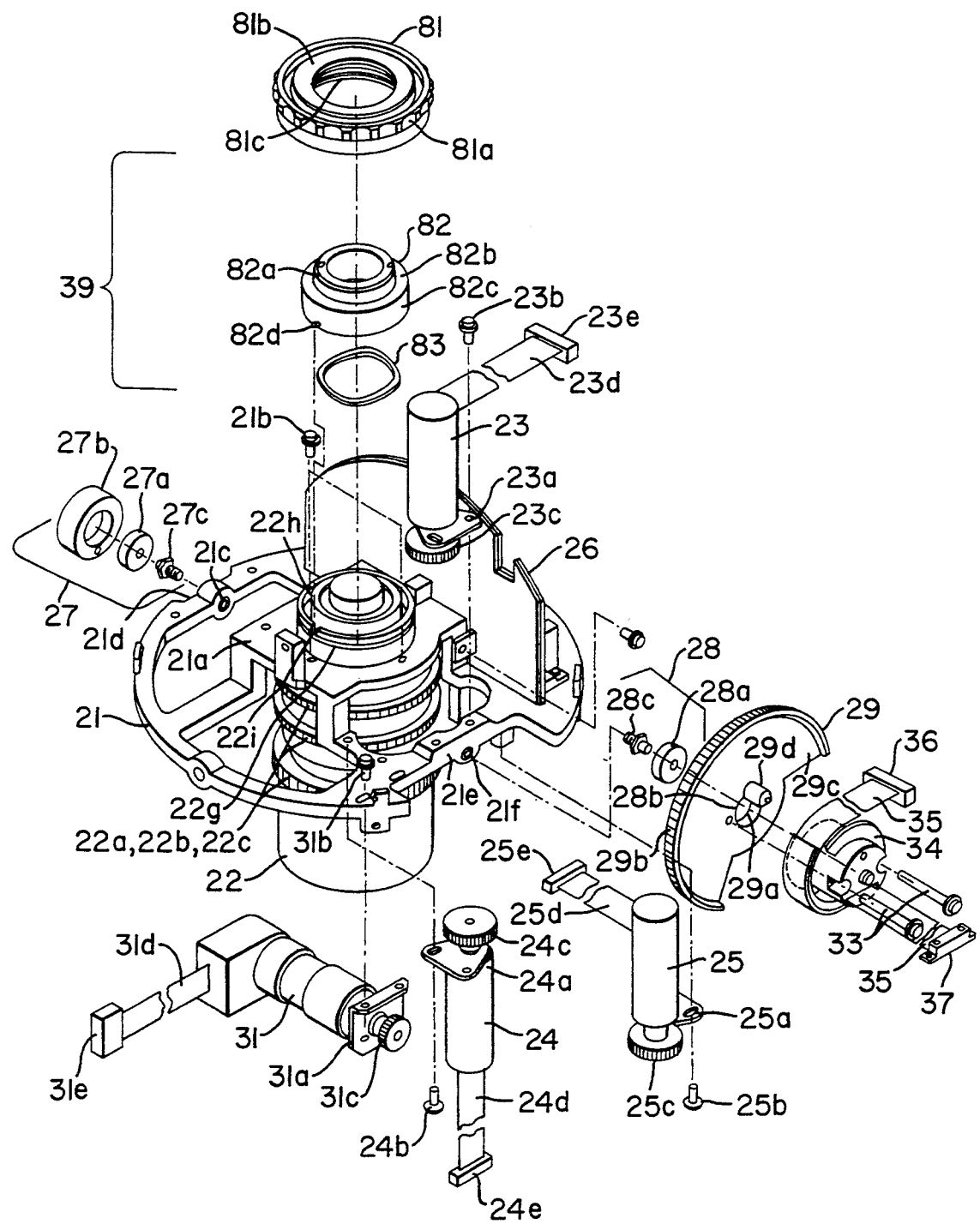
FIG. 2 shows a partially exploded view of the camera and lens assembly of the eyeball assembly of the surveillance device of FIG. 1.
Figure 3:
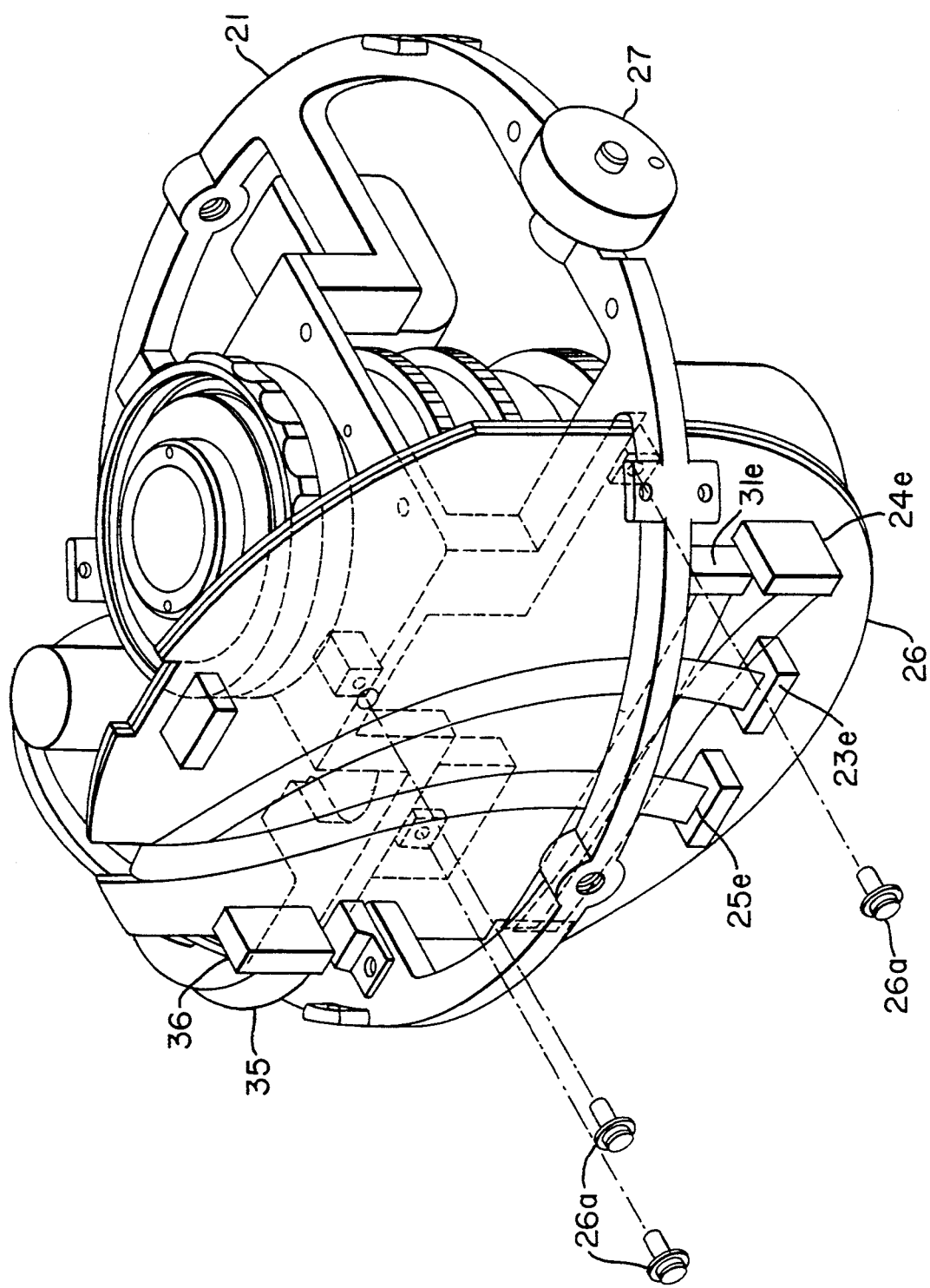
FIG. 3 shows an assembled view of the camera and lens assembly of the eyeball assembly of the surveillance device of FIG. 1.
Figure 4:
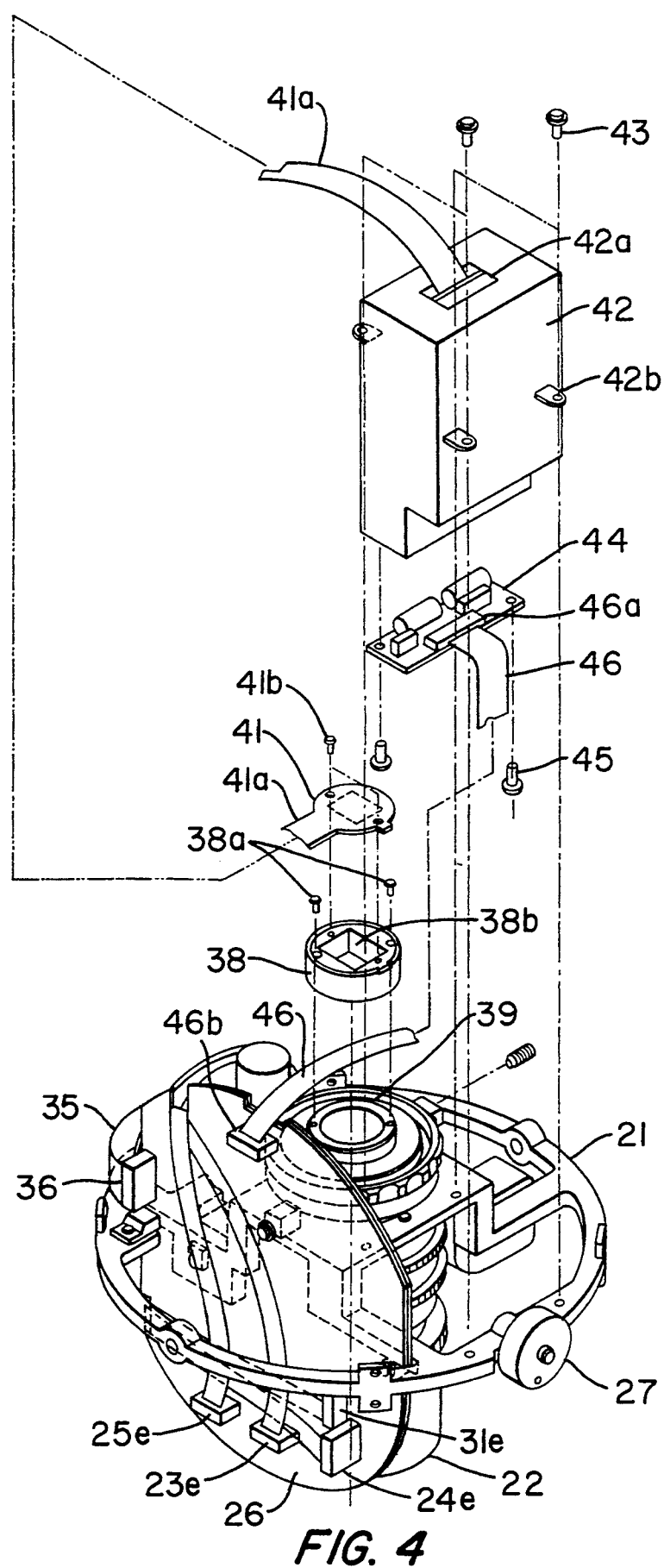
FIG. 4 show a view of the camera and lens assembly of the eyeball assembly of the surveillance device of FIG. 1 with the camera parts shown partially in exploded view.

FIGS. 2–4 show the camera and lens assembly 4 in greater detail. As shown, the mounting member 21 is used as the primary support structure for the components of the assembly. A central raised part 21a of the member 21 holds, via screws 21b, the barrel of a lens 22 which has rotatable sections 22a, 22b and 22c for controlling the usual zoom, iris and focus conditions of the lens. Associated zoom, iris and focus control motors 23, 24 and 25 are also connected via brackets 23a, 24a and 25a and screws 23b, 24b and 25b to appropriate areas of the mounting member 21 so that their respective gears 23c, 24c and 25c engage the lens sections 22a, 22b and 22c, respectively.

The motors 23–25 carry respective ribbon cables 23d, 24d and 25d and associated connectors 23e, 24e and 25e which connect the respective connectors to a camera and lens assembly PC board 26. The latter board is mounted to the member 21 via screws 26a and enables control and other signals to be coupled to and from the zoom, iris and focus motors for controlling and monitoring the corresponding conditions of the lens.

Also mounted to the mounting member 21 are couplings 27 and 28 which are provided for coupling the mounting member 21 to the carriage assembly 6. These couplings permit the mounting member 21 to be rotated about the x and y axes and, thereby, to impart this motion to the supported components, i.e., the camera and lens assembly components and the shroud 3 components, so that the entire eyeball assembly 2 is moved accordingly.

A first of these couplings 27 comprises a bearing 27a, a bearing housing 27b and a shaft 27c. The shaft 27c has a threaded end which is received in a threaded bore 21c located at one lateral end 21d of the mounting member 21. The other smooth end of the shaft 27c is press fit into the bearing 27a. The latter, in turn, is fit into the housing 27b so as to be rotatable about the x-axis.

The second coupling 28 is disposed at the opposite end 21e of the member 21 and also comprises a bearing 28a, a bearing housing 28b (formed by the surface of an aperture 29a in a sector gear 29) and a shaft 28c. The shaft 28c is also threaded at one end and this end is received in a threaded bore 21f at the end 21e of the member 21. The other smooth end of the shaft 28c is press fit into the bearing 28a which is also mounted in the bearing housing 28b so as to be rotatable about the x-axis.

In order to effect this x-axis rotation of the mounting member 21, a further tilt motor 31 is mounted to the member 21 via a bracket 31a and screws 31b. The motor 31 carries a gear 31c. The motor 31 also includes a ribbon cable 31d and connector 31e for connecting the motor to the PC board 26.

With the motor 31 appropriately driven by signals from the PC board 26, rotation of the gear 31c occurs, causing the gear to move about or around the gear face 29b of the sector gear 29. This, in turn, carries the mounting member 21 via the couplings 27 and 28 about the x-axis, to thereby effect desired x-axis rotation or tilting motion of the eyeball assembly 2 as discussed above.

Continuing with the description of the assembly 4, a spool retainer 34 is connected to an outer flat face 29c of the sector gear 29 via screws 33. A tab 29d on the face 29c engages a slot (not shown) on the retainer 34 to properly orient the retainer on the gear face.

Around the spool retainer 34 is wound a main ribbon cable 35 which is used to carry electrical signals between the assembly 4 and the carriage assembly 6. To this end, one end of the cable 35 has a connector 36 which is attached to the PC board 26, while other end of the cable 35 carries a slip ring interface or connector 37 which is attached to the carriage assembly 6 in a manner to be discussed in greater detail below.

The spool retainer 34 permits the ribbon cable 35 to be wound about the x or pivot axis and, thus, to wind and unwind as the mounting member 21 rotates. It also permits the cable 35 to pass from the eyeball assembly 2 in a plane parallel to the pivot axis. As a result, a substantial portion of the cable can be arranged in the eyeball assembly 2 compactly and so as to avoid the other components of the assembly when the eyeball is pivoted.

Furthermore, since only a small section of the cable need be outside the eyeball, the cable is less observable and less likely to entangle with the carriage assembly components. By winding the ribbon cable 35 about the pivot axis and passing it from the eyeball assembly parallel to this axis, bending of the cable which could lead to breaking of the cable is also avoided.

The camera portion of the camera and lens assembly 4 is best seen in FIG. 4. As shown, a camera adapter 38 is mounted via screws 38a to a camera/lens mounting 39 which will be discussed in greater detail hereinbelow. The camera adapter 38 carries an image pick-up unit 41 which is secured to the adapter 38 via screws 41b. A central aperture 38b in the adapter 38 permits images from the lens 22 to be received by the image pick-up unit. A ribbon cable 41a is used to carry signals between the pick-up unit 41 and a camera body 42. The cable 41a is received in the camera body through an aperture 42a in the body.

The camera body is mounted to the mounting member 21 via tabs 42b and screws 43. The camera body 42 carries at its lower end via attachment screws 45 a camera PC board assembly 44. The camera PC board assembly 44 includes a ribbon cable 46 having a connector 46a connected to the board and a second connector 46b connected to the PC board 26. Video signals developed by the camera and control signals for the camera, are, therefore, processed and carried via these PC boards.

As above-indicated, eyeball assembly 2 comprised of the camera and lens assembly 4 and shroud 3 is carried by the carriage assembly 6 such that the assembly 2 is rotational about the x and y-axes. This is accomplished by utilizing in the carriage assembly 6 an eyeball support member 8 which is rotational about the y-axis and to which are fixedly mounted the couplings 27 and 28 of the assembly 4. In this way, rotation about the y-axis is imparted to the couplings 27 and 28 via the support member 8 causing like rotation of the mounting member 21 and, therefore, the entire eyeball assembly, i.e., assembly 4 and shroud 3. The couplings 27 and 28, furthermore, while fixed to the eyeball support member 8, still permit rotation of the eyeball assembly about the x-axis relative to the support member. Thus, the couplings and eyeball support member cooperate to permit the desired rotation of the eyeball assembly.

Figure 5A:
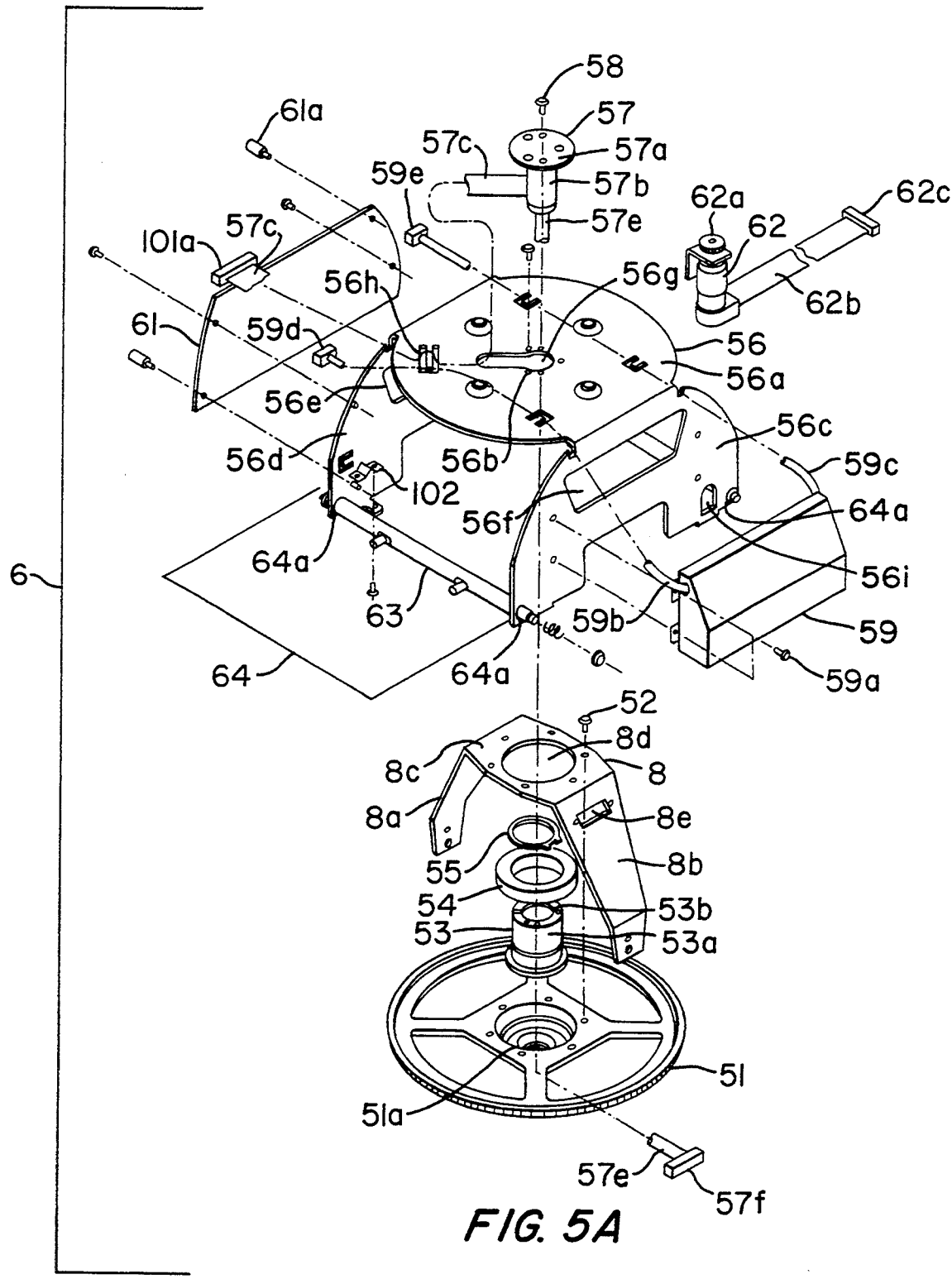
FIG. 5A shows an exploded view of the carriage assembly of the surveillance device of FIG. 1.
Figure 6:
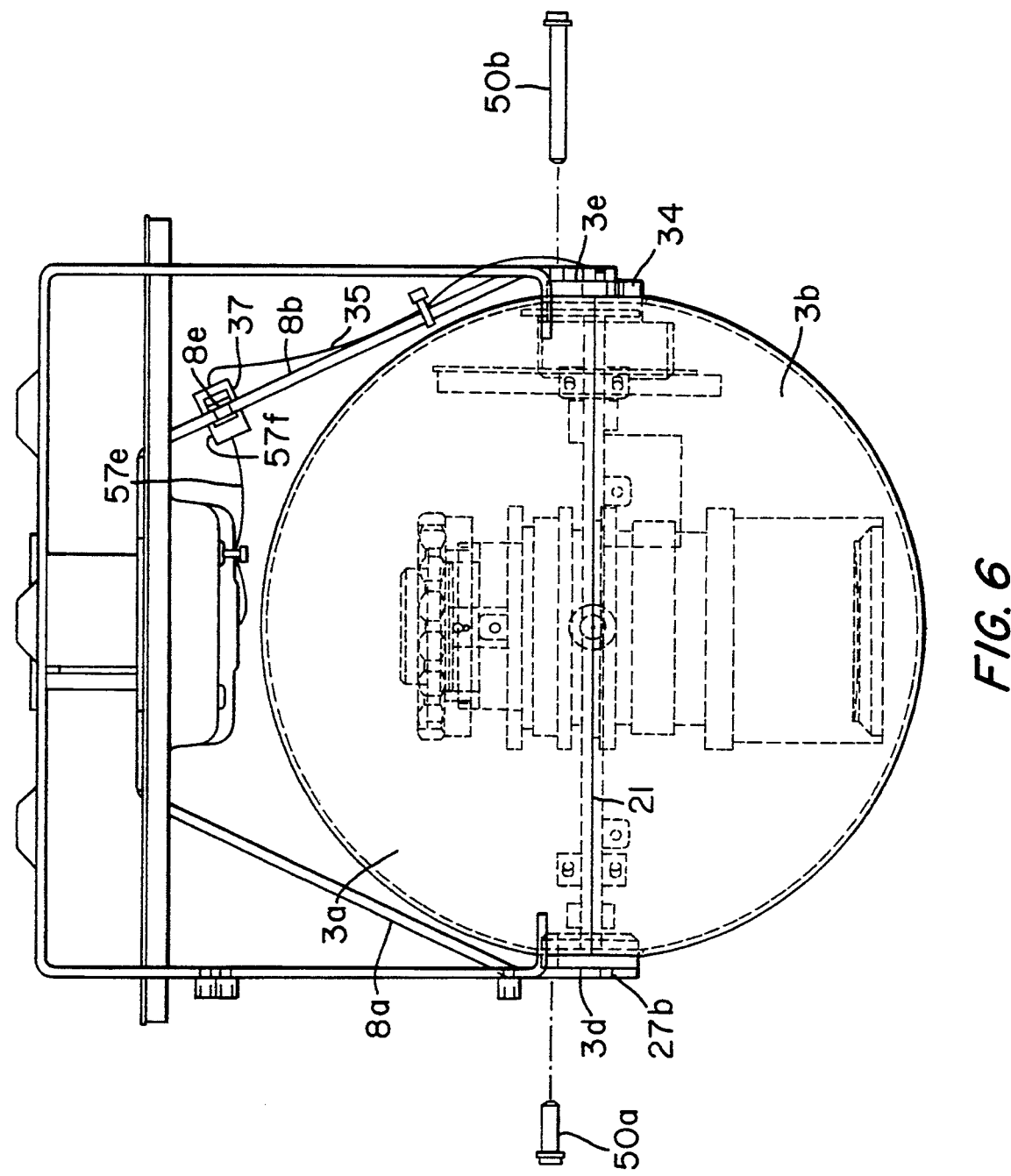
FIG. 6 shows an assembled view of the eyeball and carriage assemblies of the surveillance device of FIG. 1.

FIGS. 5A, 5B and 6 illustrate the carriage assembly 6 and the eyeball support member 8 in greater detail. As shown, the member 8 is in the form of a yoke having two arms 8a and 8b which extend from a flat connecting or middle section 8c. The arms 8a and 8b are fixedly connected to the couplings 27 and 28 (see FIG. 6) via screws 50a and 50b which attach the arms to the bearing housing 27b and the spool retainer 34 of the assembly 4. These screws pass through apertures 3d and 3e formed by mating slots 3f in the shells 3a and 3b of the shroud 3.

As can be appreciated, the fixed connection of the arms 8a and 8b to the couplings 27 and 34 enables the rotation of the member 8 about the y-axis to be carried, via the couplings, to the mounting member 21. It also allows the mounting member 21 to rotate about the x-axis relative to the member 8. The desired rotation of the eyeball assembly 2 about these axes can thus occur.

Rotation of the eyeball support member 8 about the y-axis is realized in the carriage assembly 6 by mounting the member 8, via screws 52, to a pan gear 51. The pan gear 51 includes a recessed seating area 51a in which a collar 53 is captured by a bearing 54 which is press fit into the seating area. A retaining ring 55 fits around the upper section 53a of the collar as an added means of preventing any upward movement of the bearing.

The upper section 53a of the collar 53 passes above the bearing 54 and through an aperture 8d in the connecting section 8c of the member 8. The end face 53b of the section 53a abuts and is connected to the bottom surface of a top bracket plate 56a of a carriage bracket 56. This connection is made via screws 58 which pass through holes 56b in the plate 56a and engage threaded holes in the end face 53b of the collar section 53a.

With the above configuration, the collar 53 and bearing 54 hold the pan gear 51 to the carriage bracket 56, while the bearing 54 permits the gear 51 to rotate about the y-axis relative to the bracket. The eyeball support member 8, which is fixed to the gear 51 is thus likewise held to the carriage bracket 56, while able to rotate with the gear 51 about the y-axis relative to the bracket.

To impart rotational movement to the pan gear 51, a pan motor 62 having a gear 62a is provided. The motor 62 is mounted to a side plate 56d of the carriage bracket 56 such that the gear 62a engages a portion of the pan gear 51 which passes through a slot 56e in the side plate 56d and a slot 56f in side plate 56c. The pan motor 62 has a ribbon cable 62b and an associated connector 62c. The latter is connected to a central processing unit (CPU) PC board 61. The PC board 61 receives signals for controlling the surveillance device 1 from a remote location and transmits signals to and receives signals from the other components of the device 1 including those of the eyeball assembly via the PC board 26.

The PC board 61 is mounted by screws 61a to the side plate 56d of the bracket 56. A second side plate 56c of the bracket 56 carries a power supply 59 which is mounted by screws 59a to the side plate. The side plate 56c also has a slot 56f for accomodating the pan gear 51. Cables 59b and 59c (shown in dotted line) have terminals 59d and 59e which connect to the PC board 61 for providing power to the components being supplied signals by the board.

The carriage bracket 56 also carries a slip ring 57. The slip ring 57 has a round flat mounting plate 57a which is secured to the top bracket plate 56a via the screws 58 used to mount the collar 53. The connecting assembly 57b of the slip ring extends below the plate 57a and passes through a slot 56g in the bracket plate 56a and down through the member 8, retainer ring 55, bearing 54, collar 53 and pan gear 51.

A first ribbon cable 57c from the assembly 57b is held in place in a first slot 56h of the top plate 56a, while a cable 57e has a connector 57f which is held in a slot 8e in the arm 8b of the eyeball support member 8 (see, FIG. 6). The connector 37 of the main ribbon cable 35 of the PC board 26 of the assembly 4, in turn, is held at the slot 8e for connection to the connector 57f of the slip ring. The end of ribbon cable 57c is connected to the PC board 61 by a connector 101a. The aforesaid connections of the slip ring 57 allow signals to be passed between the PC board 61 and the PC board 26 and the various components of the surveillance device.

As above-noted, the carriage assembly 6 is supported by the housing support section 7a of the housing 7. To allow easy and quick mounting of the assembly 6 to the housing support section 7a, the carriage bracket 56a of the carriage assembly is provided with two like pivot and engagement assemblies 63. These assemblies 63 are mounted on opposite sides of the carriage bracket and, in particular, between apertures 64a in opposing, lower lateral or outward ends 64 of the side plates 56c and 56d. Each assembly 63 (see, FIG. 5B) includes a sleeve 63a having opposing flat surfaces which seat in corresponding flat sides 64b of the apertures 64a to hold the sleeves in place.

Within each sleeve 63a are two-like pin asemblies 65. Each pin assembly includes a pin 66 having a pivot or engagement end 66a and a spring 67 surrounding the pin inward of this end. Each spring 67 engages at one end 67a the outer surface 64c of a bracket end 64 and at its other end 67b a retainer washer 63b which grips the corresponding pin 66 inward of the end 66a. This causes each pin 66 to be biased so that its pin end 66a is brought or forced outward of the associated sleeve 63a.

Outward movement of each pin 66 is limited by an actuator tab 68 which is held in an aperture 66b located at a second end 66c of the pin. Each tab 68 passes through an associated elongated slot 63c in the sleeve 63a, which slot interacts with the tab to provide the limited outward movement.

By applying a force on each tab 68 to move the tab toward the middle of the respective sleeve 63a, the bias force of the spring 67 is counteracted, thereby bringing the corresponding pin end 66a inward of the sleeve. As will be discussed hereinbelow, this action is used on the two tabs 68 of each pivot and engagement assembly 63 when mounting the carriage assembly 6 and its attached eyeball assembly 2 to the housing support section 7a.

Figure 7A:
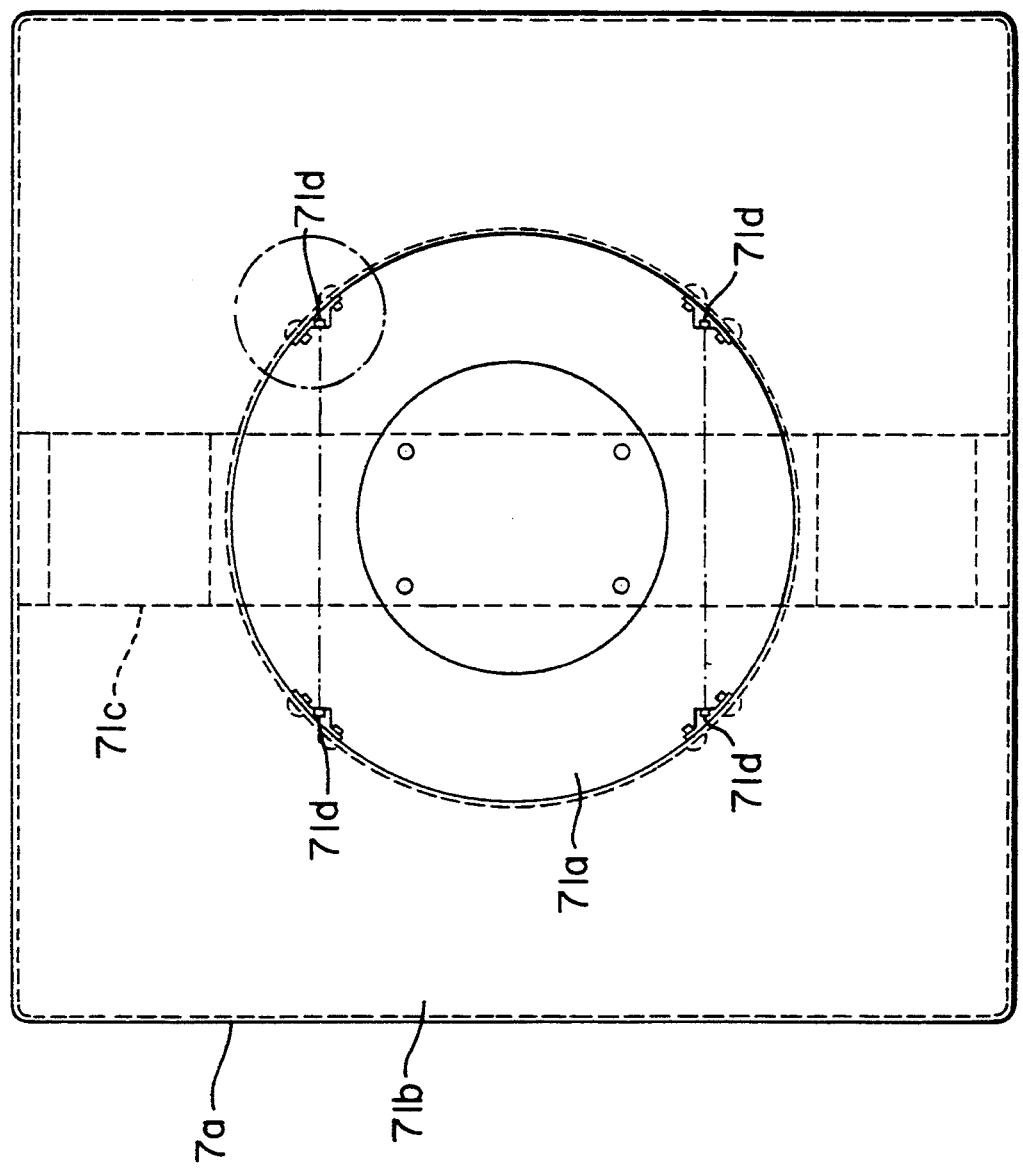
Figure 7C:
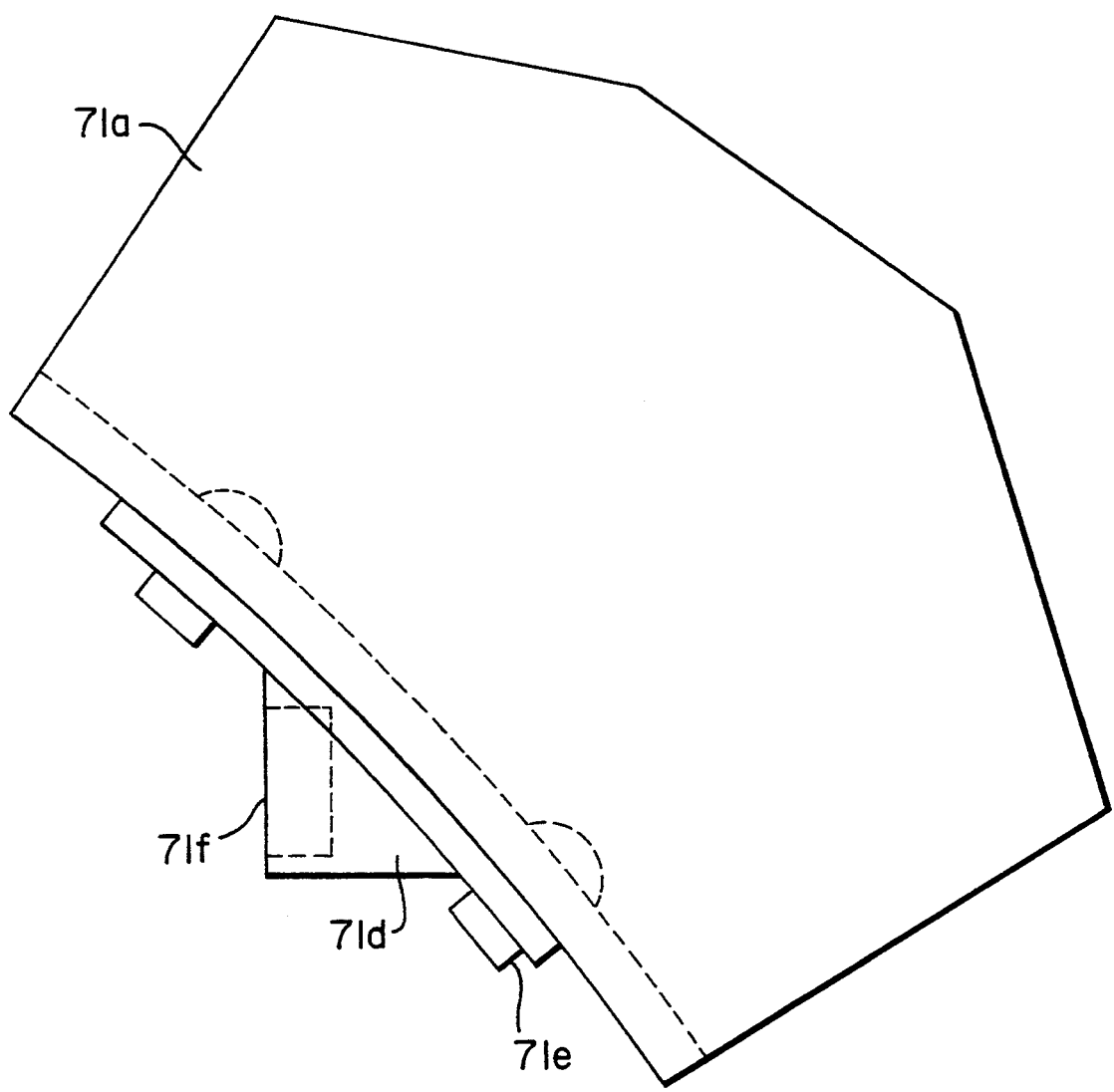

As shown in FIGS. 7A–7C, the aforesaid housing support section 7a comprises a dome portion 71a and a flange portion 71b. The flange portion 71b borders the lower peripheral edge of the dome portion and is shown as flat and square-shaped. A rectangular brace 71c is attached to and extends centrally over these housing portions to add rigidity to the structure.

The dome portion 71a is additionally provided with seating blocks 71d (see, FIG. 7C) which are held by rivets 71e to inner wall of the dome. The seating blocks 71d are arranged in opposing pairs and define first and second seating areas for the housing support section 7a. Each seating block 71d includes a slot 71f which forms its respective seating area.

The carriage assembly 6 and attached eyeball assembly 2 are affixed to the housing support section 7a by first engaging the actuator tabs 68 of one of the assemblies 63 to bring the associated pins 66 and their pin ends 66a toward each other. The carriage bracket 56 is then held and positioned so that the retracted pins of the assembly 63 are situated in facing relationship to the slots 71f of an opposing pair of seating blocks 71d.

The held actuator tabs 68 are then released, causing the pin ends 66a of the corresponding pins 66 to engage and seat in the seating slots 71f. This pivotably locks one of the engagement and pivot assemblies 63 to the housing support section 7a with the carriage assembly 6 and eyeball assembly 2 being suspended from this one pivot assembly.

The carriage bracket 56 is then pivoted via rotation of the pin ends 66a of the locked assembly 63 in their respective slots 71f. This pivoting continues until the other pivot and engagement assembly 63 is situated with its pins 66 in facing relationship to the slots 71f in the other pair of seating blocks 71d. The actuator tabs 68 of the second assembly 63, which tabs have been held during rotation to withdraw the corresponding pins 66, are now released. The pin ends 66a of these pins then engage and seat in the respective slots 71f. The second pivot and engagement assembly 63 is thus now also locked to the housing support section 7a.

With the locking of this second pivot and engagement assembly 63, the carriage assembly 6 becomes supported by the housing support section 7a in suspended fashion. The eyeball assembly 2 which is held by the carriage assembly 6 is then also supported in this fashion so as to be able to pan and tilt, as above-described, for viewing the location under surveillance.

Figure 8B:
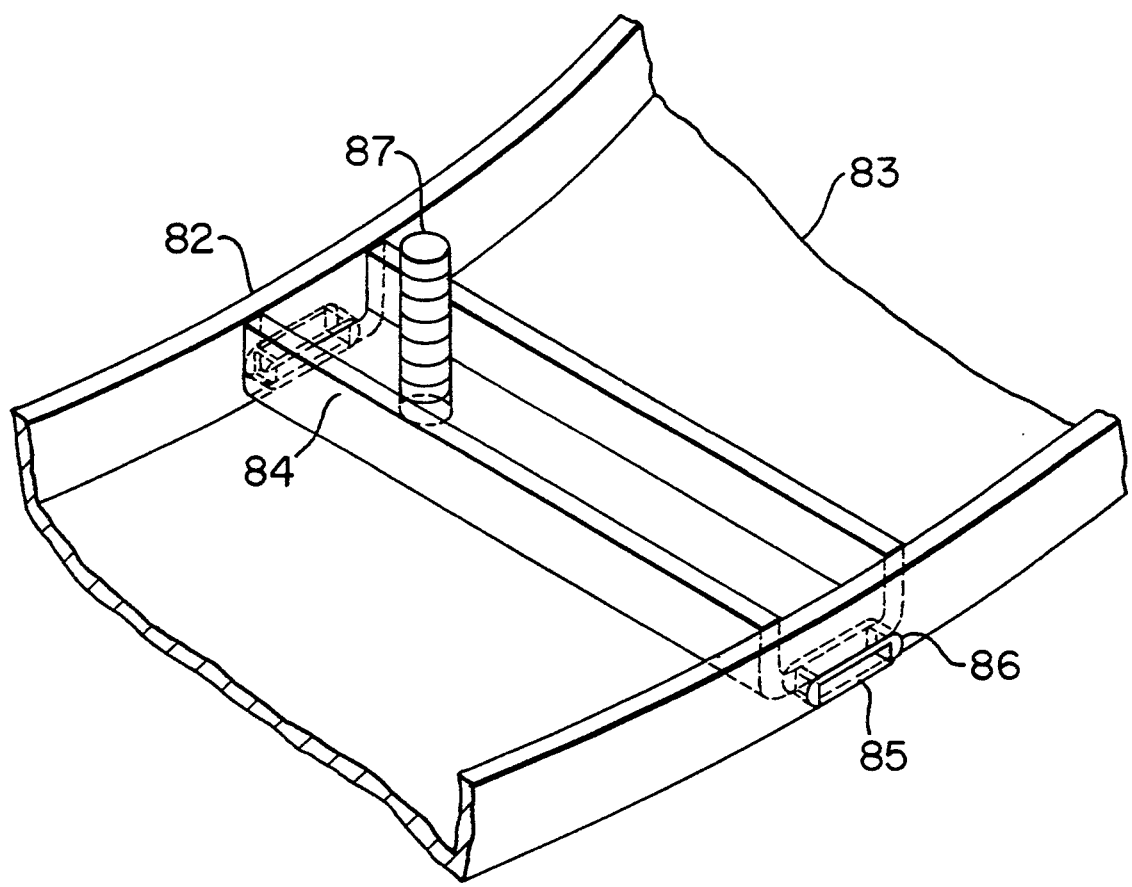

Once the carriage assembly 6 is mounted to the housing support section 7a, the housing cover section 7b is brought into abutting relationship with the housing support section to fully enclose the carriage and eyeball assemblies in the housing 7. FIGS. 8A and 8B show the housing cover section 7b in greater detail. As shown, it comprises a dome shaped portion 81a which is surrounding by a lip 81b. A decorative skirt 82 is connected to and extends outward of the lip 81b.

A channel 83 (see, FIG. 8B) in the skirt 82 supports clips 84 having tabs 85 which engage corresponding slots 86 in the channel walls. Each clip 84 carries an upwardly extending stud 87 which passes through a corresponding aperture 81c in the lip 81b. Fastener ball 88 connected to the studs 87 lock the skirt 82 and lip 81b together. A hinge element 89 is also affixed to the bar 87 of one of the clips 84 and becomes captured by the fastener ball 88.

During assembly, the housing cover section 7b is first attached to the carriage bracket 56 by inserting the hinge element 89 into an aperture 56 in the side plate 56c. Once the bracket 56 is mounted to the housing support section 7a, the cover 7b is then rotated via the hinge element 89 to bring the ball studs 88 into clips 102 carried on the inside walls of the bracket plates 56c and 56d. This results in total enclosure of the carriage assembly 6 and eyeball assembly 2 in the housing 7.

As above-indicated, the camera and lens assembly 4 is provided with a camera/lens mounting 39 for mounting the camera assembly, i.e., in the present case, the image pickup unit 41 supported on the adapter 38, to the lens 22. This mounting is adapted to permit movement of the mounting axially of the lens 22. As a result, the position of the mounting and, hence, the supported camera assembly, can be adjusted relative to the focal point of the lens, i.e., the back focus condition of the lens and camera can be adjusted.

Figure 9:
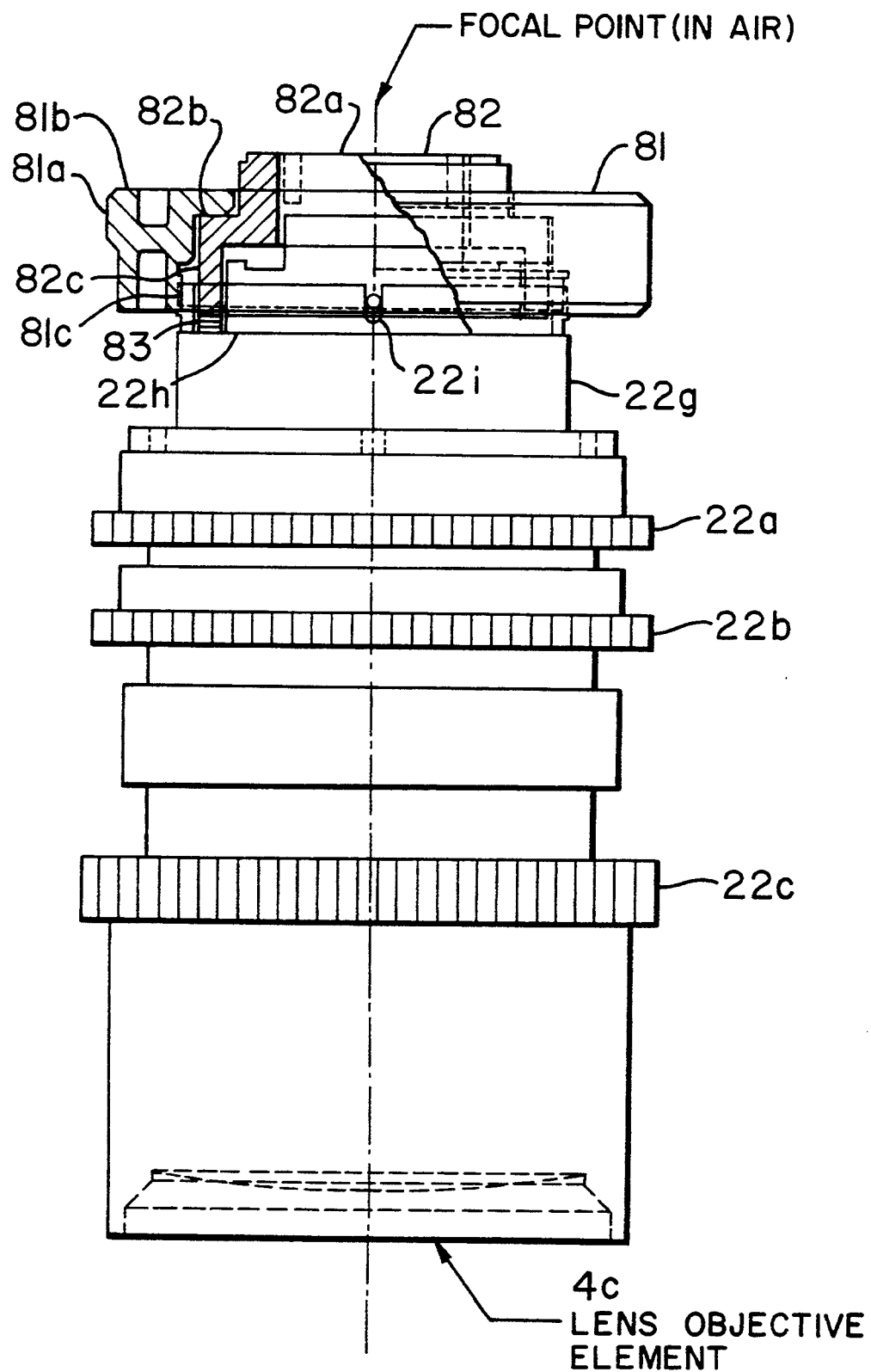
FIG. 9 shows a cross sectional view of the lens assembly depicting the camera/lens mounting of the camera and lens assembly of FIG. 2.

As shown in FIGS. 2 and 9, the camera/lens mounting 39 comprises a locking and adjusting ring or nut 81, a shouldered tubular member 82 and a resilient member in the form of a wavy metallic spring washer or annular member 83. The shouldered member 82 has an upper narrow tubular end 82a, a shoulder 82b and a wide lower tubular end 82c provided with a setting pin 82d. The member 83 comprises an annular body which undergoes undulations when proceeding around the circumference of the body. The body typically might have three or four undulations or waves at equal intervals about the circumference, i.e., at 90° intervals for four waves and at 120° intervals for three waves.

The locking and adjusting nut 81 has grips 81a on its outer surface and its inner surface has a top annular section 81b which is adapted to engage the shoulder 82b of the shouldered member 82. The inner surface also has a side wall section 81c which is threaded and adapted to engage corresponding threads on the lens end collar 22g to which the components of the camera/lens mounting 39 are to be affixed. The end collar 22g of the lens also has an annular slot 22h provided with a notch 22i in its end wall.

The camera/lens mounting 39 is attached to the collar 22g by first placing the wavy washer 83 into the slot 22h. The wide tubular end 82c of the shouldered member 82 is then situated in the slot over the washer with its setting pin 82d in the notch 22i of the slot. The locking ring 81 is then placed over the member 82 so that the narrow tubular end 82a of the member 82 protrudes above the ring. The ring is then turned so that the threads on its inner side wall section 81c engage the threads on the outer surface of the collar 22g. As the nut is rotated, the surface section 81b engages the shoulder 82b of the member 82 so that the shouldered member becomes locked to the lens. This locking is a positive locking due to the presence and force exerted on the shouldered member 82 by the wavy washer 83.

By rotating the nut 81 to different positions, the position of the shouldered member 82 can be adjusted, while still retaining a positive locking condition due to the wavy washer 83. This allows the shouldered member 82 and the supported adapter 38 carrying the image pickup unit 41 to be moved accurately and positively axially of the lens. Adjusting of the relative position of the image pickup 41 relative to the focal point of the lens, i.e., back-focus adjustment, is thus easily and readily achieved.

It should be noted that while the camera of the camera and lens assembly 4 has been illustrated above as having its image pickup 41 and camera body 42 as separate units, the image pickup and camera body could also be integrated into a single unit and this unit connected to the adapter 38. In such case, the camera body and its components may comprise an integrated circuit board or card which would be connected to the image pickup.

It should also be noted that the shells 3a, 3b of the shroud can be made of a metallic material or coated on their interior surfaces with a conductive material. This prevents electromagnetic emissions generated by the camera and lens assembly from escaping from the eyeball assembly and interfering with equipment in the adjacent areas.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, the camera/lens mounting 39 could be used with a camera and lens assembly which is fixed and not pivotable, as well as with cameras and lenses other than those disclosed herein. Also, the camera of a camera and lens assembly could be attached directly to the camera/lens mounting 39 without the use of an adapter 38. Such attachment could be to the end face of the tubular end 82a of the shoulder member 82 or to the outer wall of the tubular end 82a via threads provided on the wall.

What is claimed is

1. A surveillance assembly comprising:
   an eyeball assembly including: a camera and lens assembly having a viewing axis and a viewing cone; a shroud substantially totally surrounding said camera and lens assembly and having a light-transmissive area aligned with the viewing axis of said camera and lens assembly and sufficient to pass said viewing cone, whereby said camera and lens assembly can view outward of said shroud;
   said eyeball assembly being adapted to be rotatable about first and second axes so as to enable rotation of said camera and lens assembly and said shroud about said first and second axes, while said viewing axis and viewing cone of said camera and lens assembly remain aligned with said light transmissive area of said shroud;
   and a housing for housing said eyeball assembly so as to permit said rotation of said eyeball assembly about said first and second axes and including a light transmissive section for passing said viewing cone of said camera and lens assembly during rotation of said eyeball assembly.

2. A surveillance assembly in accordance with claim 1 wherein:
   said eyeball assembly further comprises: a mounting member to which said camera and lens assembly and said shroud are mounted, said mounting member being enclosed by said shroud and being adapted to be rotatable about said first and second axes to enable said rotation of said eyeball assembly about said first and second axes.

3. A surveillance assembly in accordance with claim 2 wherein:
   said housing includes: a housing support section for supporting said eyeball assembly such that said eyeball assembly extends from said housing support section so as to be rotatable about said first and second axes; and said light-transmissive section is mounted such that said housing support section and said light-transmissive section fully enclose said eyeball assembly.

4. A surveillance assembly in accordance with claim 3 wherein:
   said light-transmissive section of said housing is dome shaped.

5. A surveillance assembly in accordance with claim 4 wherein:
   said shroud of said eyeball assembly is spherical in shape.

6. A surveillance assembly in accordance with claim 5 wherein:
   said housing support section is dome shaped.

7. A surveillance assembly in accordance with claim 1 wherein:
   the outer surface of the area of said shroud other than said light-transmissive area is made to simulate the light-reflectivity characteristics of the part of said camera and lens assembly aligned with said light-transmissive area.

8. A surveillance assembly in accordance with claim 9 wherein:
   said light-reflectivity characteristics are those of the glass of the front lens of said camera and lens assembly.

9. A surveillance assembly in accordance with claim 1 wherein:
said light-transmissive area comprises an aperture in said shroud.

10. A surveillance assembly in accordance with claim 1 wherein:
said shroud is spherical.

11. A surveillance assembly in accordance with claim 10 wherein:
said shroud comprises first and second part spherical shells joined together to form said spherical shroud.

12. A surveillance assembly in accordance with claim 11 wherein:
each of said first and second part spherical shells is hemispherical.

13. A surveillance assembly in accordance with claim 1 wherein:
said light transmissive area of said shroud is just sufficient to accommodate passage of said viewing cone of said camera and lens assembly.

14. A surveillance assembly in accordance with claim 1 wherein:
said surveillance assembly further comprises: a carriage assembly for carrying said eyeball assembly and for mounting said eyeball assembly to said housing; said carriage assembly including a support means adapted to be rotatable about said first axis;
and said eyeball assembly is adapted to be carried by said support means of said carriage assembly so as to permit said eyeball assembly to be rotatable about said first axis with the rotation of said support means about said first axis and to be rotatable about said second axis relative to said support means.

15. A surveillance assembly in accordance with claim 14 wherein:
said eyeball assembly further comprises: a mounting member to which said camera and lens assembly and said shroud are mounted; and coupling means for coupling said mounting member to said support means such that said mounting member is rotatable about said first axis with the rotation of said support means and such that said mounting member is rotatable about said second axis relative to said support means.

16. A surveillance assembly in accordance with claim 15 wherein:
said coupling means includes: first and second couplings connected to opposing peripheral parts of said mounting member, each coupling including a shaft fixedly connected to said mounting member, a bearing fixed to said shaft and a bearing housing for supporting the bearing such that the bearing is rotatable about said second axis;
and said support means of said carriage assembly comprises a yoke having first and second arms which are fixedly connected to the bearing housings of said first and second couplings, respectively.

17. A surveillance assembly in accordance with claim 16 wherein:
said shroud has first and second apertures adjacent the bearing housings of said first and second couplings for permitting said bearing housings to be connected to said first and second arms.

18. A surveillance assembly in accordance with claim 16 wherein:
the bearing housing of said first coupling has a peripheral surface formed as a first gear;
and said eyeball assembly further includes: a second gear rotatably mounted to said mounting member so as to be engageable with said first gear and so as to travel along said peripheral surface defined by said first gear when said second gear is rotated; and means for rotating said second gear.

19. A surveillance assembly in accordance with claim 18 wherein:
said carriage assembly further includes: a third gear rotatable about said first axis and supporting said yoke; and means for rotating said third gear.

20. A surveillance assembly in accordance with claim 1 further comprising:
a carriage assembly for carrying said eyeball assembly and for mounting said eyeball assembly to said housing, said carriage assembly including a pivot means situated along a first side of said carriage assembly and an engagement means situated along a second side of said carriage assembly, said pivot means being adapted to engage a first surface area of said housing so as to permit said carriage assembly to be pivotted to bring said engagement means into engagement with a second surface area of said housing, thereby causing said carriage assembly and said eyeball assembly carried by said carriage assembly to be mounted to said housing.

21. A surveillance assembly in accordance with claim 20 wherein:
said pivot means is adapted to releasably, lockingly pivotably engage said first surface area of said housing;
and said engagement means is adapted to releasably, lockingly engage said second surface area of said housing.

22. A surveillance assembly in accordance with claim 21 wherein:
said engagement means can perform the function of said pivot means with respect to said second surface area;
and said pivot means can perform the function of said engagement means with respect to said first surface area when said engagement means is performing the function of said pivot means.

23. A surveillance assembly in accordance with claim 20 wherein:
said pivot means includes: an elongated first member having first opposite ends which form pivot points and are adapted to pivotably engage first spaced seating areas on said first surface area of said housing;
and said engagement means includes: an elongated second member having second opposite ends which are adapted to engage second spaced seating areas on said second surface area of said housing.

24. A surveillance assembly in accordance with claim 23 wherein:
said elongated first member is such that the first ends of said first member can be brought toward and away from each other, whereby said first ends can be brought toward each other to align said first ends with said first seating areas and then brought away from each other so that said first ends can be seated into said first seating areas;
and said elongated second member is such that the second ends of said second member can be brought toward and away from each other, whereby said second ends can be brought toward each other to align said second ends with said second seating areas and then brought away from each other so that said second ends can be seated into said second seating areas.

25. A surveillance assembly in accordance with claim 24 wherein:

said elongated first member includes: first biasing means for biasing said first ends away from each other; and first means for reducing the bias provided by said first biasing means to bring said first ends toward each other;

and said elongated second member includes: second biasing means for biasing said second ends away from each other; and second means for reducing the bias provided by said second biasing means to bring said second ends away from each other.

26. A surveillance assembly in accordance with claim 25 wherein:

said carriage assembly further includes: a first plate which carries said eyeball assembly; and second and third opposing plates extending from opposing ends of said first plate;

and said first and second elongated members are supported between respective first and second pairs of outer opposing ends of said second and third plates.

27. A surveillance assembly in accordance with claim 26 wherein:

said first elongated member is supported by the first pair of opposing ends of said second and third plates such that the first ends of said first elongated member extend beyond the first pair of opposing ends of said second and third plates, said first elongated member including: a first tubular member having first and second ends mounted to the first pair of opposing ends of said second and third plates; first and second rods slidably housed within said first tubular member such that a first end of said first rod is adjacent said first end of said first tubular member and a second end of said second rod is adjacent said second end of said first tubular member; first and second springs surrounding said first and second rods, said first spring being fixed at one end to said first rod inward of said first end of said first rod and being fixed at its other end by engagement with the end of the first pair of ends of said second and third plates supporting said first end of said first tubular member, and said second spring being fixed at one end to said second rod inward of said second end of said second rod and being fixed at its other end by engagement with the end of the first pair of ends of said second and third plates supporting said second end of said first tubular member, whereby said first and second rods are biased such that the first end of said first rod and the second end of said second rod are brought away from each other and outward of said first and second ends of said first tubular member; first and second slots in said first tubular member for accessing said first and second rods and first and second tabs extending through said first and second slots in said first tubular member and affixed to said first and second rods, respectively, said first and second slots and said first and second tabs limiting the extent to which said first and second ends of said first and second rods are brought away from each other and outward of said tubular member by said first and second springs, said first and second tabs permitting respective inward forces to be applied to said first and second rods to reduce the outward bias force of said first and second springs on said first and second rods to bring said first end of said first rod and said second end of said second rod toward each other and inward of said first tubular member;

and said second elongated member is supported by the second pair of opposing ends of said second and third plates such that the second ends of said second elongated member extend beyond the second pair of opposing ends of said second and third plates, said second elongated member including: a second tubular member having third and fourth ends mounted to the second pair of opposing ends of said second and third plates; third and fourth rods slidably housed within said second tubular member such that a third end of said third rod is adjacent said third end of said second tubular member and a fourth end of said fourth rod is adjacent said fourth end of said second tubular member; third and fourth springs surrounding said third and fourth rods, said third spring being fixed at one end to said third rod inward of said third end of said third rod and being fixed at its other end by engagement with the end of the second pair of ends of said second and third plates supporting said third end of said second tubular member, and said fourth spring being fixed at one end to said fourth rod inward of said fourth end of said fourth rod and being fixed at its other end through engagement with the end of the second pair of ends of said second and third plates supporting said fourth end of said second tubular member, whereby said third and fourth rods are biased such that the third end of said third rod and the fourth end of said fourth rod are brought away from each other and outward of said third and fourth ends of said second tubular member; third and fourth slots in said second tubular member for accessing said third and fourth rods and third and fourth tabs extending through said third and fourth slots in said second tubular member and affixed to said third and fourth rods, respectively, said third and fourth slots and third and fourth tabs limiting the extent to which said third and fourth ends of said third and fourth rods are brought away from each other and outward of said second tubular member by said third and fourth springs, said third and fourth tabs permitting respective inward forces to be applied to said third and fourth rods to reduce the outward bias force of said third and fourth springs on said third and fourth rods to bring said third end of said third rod and said fourth end of said fourth rod toward each other and inward of said second tubular member.

28. A surveillance assembly in accordance with claim 23 wherein:

said carriage assembly further includes: a first plate which carries said eyeball assembly; and second and third opposing plates extending from opposing ends of said first plate;

and said first and second elongated members are supported between respective first and second pairs of outer opposing ends of said second and third plates.

29. A surveillance assembly in accordance with claim 28 wherein:

said carriage assembly further includes: a yoke having first and second arms and mounted to said first plate so as to be rotatable about said first axis;

and said eyeball assembly includes coupling means for coupling said eyeball assembly between and to said arms of said yoke so as to be rotatable about said first axis with said yoke and so as to be rotatable about said second axis relative to said yoke.

30. A surveillance assembly in accordance with claim 29 wherein:

said first axis is vertical and said second axis is horizontal.

31. A surveillance assembly in accordance with claim 29 further comprising:

first means for causing said yoke to be rotated, thereby rotating said eyeball assembly, relative to said first plate about said second axis;

and second means for causing said eyeball assembly to be rotated relative to said yoke about said first axis.

32. A surveillance assembly in accordance with claim 31 wherein:

said first means comprises: a gear to which said yoke is mounted, said gear being rotatably mounted about said first axis to said first plate; and means for rotating said gear about said first axis;

said coupling means includes first and second couplings connected to said first and second arms of said yoke;

and said second means comprises: a mounting member to which said lens and camera assembly and said shroud are mounted, said shroud surrounding said mounting member and said mounting member being connected at opposing ends to said first and second couplings; a gear assembly including a first gear to which said mounting member is attached and a second gear forming part of one of said couplings; and means for causing said first gear to rotate and move about said second gear.

33. A surveillance assembly in accordance with claim 1 wherein:

the outer surface of the area of said shroud other than said light-transmissive area is opaque.

34. A surveillance assembly in accordance with claim 1 wherein:

said shroud comprises a metallic material.

35. A surveillance assembly in accordance with claim 1 wherein:

the inner surface of said shroud includes a conductive coating.

36. A surveillance assembly in accordance with claim 14 further comprising:

an electrical cable extending from said camera and lens assembly in said eyeball assembly to said carriage assembly;

and cable support means mounted in said surveillance assembly for supporting a portion of said cable in wound relationship about said second axis.

37. A surveillance assembly in accordance with claim 36 wherein:

said cable support means supports said cable such that said cable leaves said cable support means in the direction of said carriage assembly in a plane parallel to said second axis.

38. A surveillance assembly in accordance with claim 37 wherein:

said cable support means is mounted so as to be within said eyeball assembly and so as not to rotate about said second axis with said eyeball assembly and so as rotate about said first axis with said eyeball assembly.

39. A surveillance assembly in accordance with claim 38 wherein:

said cable support means is a spool member mounted with its axis along said second axis.

40. Surveillance assembly in accordance with claim 36 wherein:

said cable is a flat ribbon cable.

41. A surveillance assembly in accordance with claim 18 further comprising:

an electrical cable extending from said camera and lens assembly in said eyeball assembly to said carriage assembly;

and cable support means mounted to the bearing housing of said first coupling for supporting a portion of said cable in wound relationship about said second axis and such that said cable leaves said cable support means in a plane parallel to said second axis.

42. A surveillance assembly in accordance with claim 41 wherein:

said cable is a flat ribbon cable.

43. A surveillance assembly comprising:

an eyeball assembly including: a camera and lens assembly having a viewing axis and a viewing cone; a shroud substantially totally surrounding said camera and lens assembly and having a light-transmissive area aligned with the viewing axis of said camera and lens assembly and sufficient to pass said viewing cone, whereby said camera and lens assembly can view outward of said shroud;

said eyeball assembly being adapted to be rotatable about first and second axes so as to enable rotation of said camera and lens assembly and said shroud about said first and second axes, while said viewing axis and viewing cone of said camera and lens assembly remain aligned with said light transmissive area of said shroud, said eyeball assembly including first means adjacent spaced peripheral points of said eyeball assembly and adapted to be connected to and rotate with a part of a carriage assembly for carrying said eyeball assembly and for rotating said eyeball assembly about said first axis.

44. A surveillance assembly in accordance with claim 43 wherein:

said first means is further adapted to allow said eyeball assembly to rotate about said second axis relative to said part of said carriage assembly.

45. A surveillance assembly in accordance with claim 44 wherein:

said first means includes first and second couplings located at said peripheral positions for coupling said eyeball assembly to said part of said carriage assembly to permit said eyeball assembly to rotate about said first axis with said part of said carriage assembly and to permit said eyeball assembly to rotate about said second axis relative to said part of said carriage assembly.

46. A surveillance assembly in accordance with claim 45 wherein:

said eyeball assembly further comprises a mounting member to which said camera and lens assembly and said shroud are mounted;

and said first and second couplings being connected to opposing peripheral parts of said mounting member so as to permit said mounting member to rotate about said first axis with said first part of said carriage assembly and to permit said mounting member to rotate about said second axis relative to said part of said carriage assembly.

47. A surveillance assembly in accordance with claim 46 wherein:
each of said first and second couplings includes: a shaft fixedly connected to said mounting member, a bearing fixed to said shaft and a bearing housing for supporting the bearing such that the bearing is rotatable about said second axis.

48. A surveillance assembly in accordance with claim 47 further comprising:
said carriage assembly including said part;
and said first and second couplings are fixedly attached to said part.

49. A surveillance assembly in accordance with claim 48 wherein:
said part comprises a yoke rotatably mounted relative to said first axis, said yoke having first and second arms fixedly attached to the bearing housings of said first and second couplings.

50. A surveillance assembly in accordance with claim 47 wherein:
said shroud has first and second apertures adjacent the bearing housings of said first and second couplings for permitting said bearing housings to be connected to said first and second arms.

51. A surveillance assembly in accordance with claim 49 wherein:
the bearing housing of said first coupling has a peripheral surface formed as a first gear;
and said eyeball assembly further includes: a second gear rotatably mounted to said mounting member so as to be engageable with said first gear and so as to travel along said peripheral surface defined by said first gear when said second gear is rotated; and means for rotating said second gear.

52. A surveillance assembly in accordance with claim 46 further comprising:
said carriage assembly including said part;
and said first and Second couplings are fixedly attached to said part.

53. A surveillance assembly in accordance with claim 52 wherein:
said part comprises a yoke rotatably mounted relative to said first axis, said yoke having first and second arms fixedly attached to said first and second couplings.

54. A surveillance assembly in accordance with claim 43 wherein:
the outer surface of the area of said shroud other than said light-transmissive area is made to simulate the light-reflectivity characteristics of the part of said camera and lens assembly aligned with said light-transmissive area.

55. A surveillance assembly in accordance with claim 54 wherein:
said light-reflectivity characteristics are those of the glass of the front lens of said camera and lens assembly.

56. A surveillance assembly in accordance with claim 43 wherein: said shroud comprises a metallic material.

57. A surveillance assembly in accordance with claim 43 wherein:
the inner surface of said shroud includes a conductive coating.

58. A surveillance assembly in accordance with claim 43 wherein:
said surveillance assembly is to be used with an electrical cable extending from said camera and lens assembly in said eyeball assembly to said carriage assembly;
and said surveillance assembly further comprises: cable support means mounted in said surveillance assembly for supporting a portion of said cable in wound relationship about said second axis.

59. A surveillance assembly in accordance with claim 58 wherein:
said cable support means supports said cable such that said cable leaves said cable support means in the direction of said carriage assembly in a plane parallel to said second axis.

60. A surveillance assembly in accordance with claim 59 wherein:
said cable support means is mounted so as to be within said eyeball assembly and so as not to rotate about said second axis with said eyeball assembly and so as rotate about said first axis with said eyeball assembly.

61. A surveillance assembly in accordance with claim 60 wherein:
said cable support means is a spool member mounted with its axis along said second axis.

62. A surveillance assembly in accordance with claim 58 wherein:
said cable is a flat ribbon cable.

63. A surveillance assembly in accordance with claim 47 further comprising:
an electrical cable extending from said camera and lens assembly in said eyeball assembly to said carriage assembly;
and cable support means mounted to the bearing housing of said first coupling for supporting a portion of said cable in wound relationship about said second axis and such that said cable leaves said cable support means in a plane parallel to said second axis.

64. A surveillance assembly in accordance with claim 63 wherein:
said cable is a flat ribbon cable.

65. Apparatus for use with a camera and lens assembly and for further use with a housing of a surveillance assembly, said housing having first spaced seating areas on a first surface of said housing and second space seating areas on a second surface of said housing, said apparatus comprising:
a carriage assembly including: means for carrying said camera and lens assembly; and a pivot means situated along a first side of said carriage assembly and an engagement means situated along a second side Of said carriage assembly, said pivot means being adapted to engage the first surface area of said housing so as to permit said carriage assembly to be pivoted while said pivot means is maintained in engagement with the first surface area of said housing to bring said engagement means into engagement with the second surface area of said housing, thereby permitting mounting of said carriage assembly to said housing with said pivot means in engagement with the first surface area of said housing and said engagement means in engagement with the second surface area of said housing,
said pivot means including: an elongated first member having first opposite ends which form pivot points and are adapted to pivotably engage the first spaced seating areas on the first surface area of said housing;

and said engagement means including: an elongated second member having second opposite ends which are adapted to engage the second spaced seating areas on said second surface area of said housing.

66. Apparatus in accordance with claim 65 wherein:

said pivot means is adapted to releasably, lockingly pivotably engage said first surface area of said housing;

and said engagement means is adapted to releasably, lockingly engage said second surface area of said housing.

67. Apparatus in accordance with claim 66 wherein:

said engagement means can perform the function of said pivot means with respect to said second surface area;

and said pivot means can perform the function of said engagement means with respect to said first surface area when said engagement means is performing the function of said pivot means.

68. Apparatus in accordance with claim 67 wherein:

said elongated first member is such that the first ends of said first member can be brought toward and away from each other, whereby said first ends can be brought toward each other to align said first ends with said first seating areas and then brought away from each other so that said first ends can be seated into said first seating areas;

and said elongated second member is such that the second ends of said second member can be brought toward and away from each other, whereby said second ends can be brought toward each other to align said second ends with said second seating areas and then brought away from each other so that said second ends can be seated into said second seating areas.

69. Apparatus in accordance with claim 68 wherein:

said elongated first member includes: first biasing means for biasing said first ends away from each other; and first means for reducing the bias provided by said first biasing means to bring said first ends toward each other;

and said elongated second member includes: second biasing means for biasing said second ends away from each other; and second means for reducing the bias provided by said second biasing means to bring said second ends away from each other.

70. Apparatus in accordance with claim 69 wherein:

said carriage assembly further includes: a first plate which carries said lens and camera assembly; and second and third opposing plates extending from opposing ends of said first plate;

and said first and second elongated members are supported between respective first and second pairs of outer opposing ends of said second and third plates.

71. Apparatus in accordance with claim 70 wherein:

said first elongated member is supported by the first pair of opposing ends of said second and third plates such that the first ends of said first elongated member extend beyond the first pair of opposing ends of said second and third plates, said first elongated member including: a first tubular member having first and second ends mounted to the first pair of opposing ends of said second and third plates; first and second rods slidably housed within said first tubular member such that a first end of said first rod is adjacent said first end of said first tubular member and a second end of said second rod is adjacent said second end of said first tubular member; first and second springs surrounding said first and second rods, said first spring being fixed at one end to said first rod inward of said first end of said first rod and being fixed at its other end by engagement with the end of the first pair of ends of said second and third plates supporting said first end of said first tubular member, and of said second spring being fixed at one end to said second rod inward of said second end of said second rod and being fixed at its other end by engagement with the end of the first pair of ends of said second and third plates supporting said second end of said first tubular member, whereby said first and second rods are biased such that the first end of said first rod and the second end of said second rod are brought away from each other and outward of said first and second ends of said first tubular member; first and second slots in said first tubular member for accessing said first and second rods and first and second tab extending through said first and second slots in said first tubular member and affixed to said first and second rods, respectively, said first and second slots and said first and second tabs limiting the extent to which said first and second ends of said first and second rods are brought away from each other and outward of said tubular member by said first and second springs, said first and second said tabs permitting respective inward forces to be applied to said first and second rods to reduce the outward bias force of said first and second springs on said first and second rods to bring said first end of said first rod and said second end of said second rod toward each other and inward of said first tubular member;

and said second elongated member is supported by the second pair of opposing ends of said second and third plates such that the second ends of said second elongated member extend beyond the second pair of opposing ends of said second and third plates, said second elongated member including: a second tubular member having second and third ends mounted to the second pair of opposing ends of said second and third plates; third and fourth rods slidably housed within said second tubular member such that a third end of said third rod is adjacent said third end of said second tubular member and a fourth end of said fourth rod is adjacent said fourth end of said second tubular member; third and fourth springs surrounding said third and fourth rods, said third spring being fixed at one end to said third rod inward of said third end of said third rod and being fixed at its other end by engagement with the end of the second pair of ends of said second and third plates supporting said third end of said second tubular member, and said fourth spring being fixed at one end to said fourth rod inward of said fourth end of said fourth rod and being fixed at its other end through engagement with the end of the second pair of ends of said second and third plates supporting said fourth end of said second tubular member, whereby said third and fourth rods are biased such that the third end of said third rod and the fourth end of said fourth rod are brought away from each other and outward of said third and fourth ends of said second tubular member; third and fourth slots in said second tubular member for accessing said third and fourth rods and third and fourth tabs extending through said third and fourth slots in said second tubular member and affixed to said third and fourth rods, respectively, said third and fourth slots and third and fourth tabs limiting the extent to which said third and fourth ends of said third and fourth rods are brought away from each other and outward of said second tubular member by said third and fourth springs, said third and fourth tabs permitting respective inward forces to be applied to said third and fourth rods to reduce the outward bias force of said third and fourth springs on said third and fourth rods to bring said third end of said third rod and said fourth end of said fourth rod toward each other and inward of said second tubular member.

72. Apparatus in accordance with claim 65 wherein:
said carriage assembly further includes: a first plate which carries said lens and camera assembly; and second and third opposing plates extending from opposing ends of said first plate;
and said first and second elongated members are supported between respective first and second pairs of outer opposing ends of said second and third plates.

73. A surveillance assembly in accordance with claim 72 wherein:
said carriage assembly further includes: a yoke having first and second arms and mounted to said first plate so as to be rotational about said first axis;
and said lens and camera assembly includes coupling means for coupling said lens and camera assembly between and to said arms of said yoke so as to be rotational about said first axis with said yoke and so as to be rotational about said second axis relative to said yoke.

74. A camera/lens mounting for mounting the image pickup of a camera to a lens, the lens including a collar at one end for receiving the mounting, the collar having threads on a threaded outer surface and an end face with an annular slot, the camera/lens mounting including:
an annular resilient member adapted to fit within said slot;
a tubular member having a first tubular end, a second tubular end of wider extent than said first tubular end and adapted to fit within said slot, and a shoulder connecting said first and second tubular ends;
and a locking and adjusting ring having an inner surface which includes a threaded sidewall surface section adapted to fit around and engage the threaded outer surface of said collar and an annular surface section adapted to allow passage through said ring of said first tubular end of said tubular member and to engage said shoulder of said tubular member;
said camera/lens mounting being connected to said collar by first inserting said annular resilient member into said slot, by next inserting said second tubular end of said tubular member into said slot against said annular resilient member and then placing said locking and adjusting ring around the outer surface of said collar and rotating said ring to cause the threads on said threaded inner sidewall surface section of said ring to engage the threads on said threaded outer surface of said collar to thereby bring the inner annular surface section of said ring into engagement with said shoulder of said tubular member and to provide positive locking of said tubular member to said collar while adjusting the position of said tubular member along the axis of said lens.

75. A camera/lens mounting in accordance with claim 73 wherein:
said resilient annular member has one or more undulations along the length of its circumference.

76. A camera/lens mounting in accordance with claim 75 wherein:
said resilient annular member is formed of spring steel.

77. A camera/lens mounting in accordance with claim 76 wherein:
said annular member is formed as a wavy washer.

78. A camera/lens mounting in accordance with claim 75 wherein:
said resilient annular member has three undulations spaced at intervals of 120° about its circumference.

79. A camera/lens mounting in accordance with claim 75 wherein:
said resilient annular member has four undulations spaced at intervals of 90° about its circumference.

80. A camera/lens mounting in accordance with claim 74 wherein:
said locking and adjusting ring includes one or more grips on its outer surface for permitting controlled rotation of said ring.

81. A camera/lens mounting in accordance with claim 74 wherein:
said collar includes a notch in its outer wall defining said annular slot;
and said tubular member includes a pin extending from the outer wall of said second tubular end of the tubular member for receipt in said notch when said second tubular end is in said annular slot said collar.

82. A method of mounting a carriage assembly supporting a camera and lens assembly to a housing of a surveillance assembly comprising:
placing first opposite ends forming pivot points of an elongated first member of a pivot member of the carriage assembly in supporting engagement with first spaced seating areas of a first surface area of the housing;
pivoting the carriage assembly via the first opposite ends of the elongated first member of the pivot member and the first spaced seating areas of the first surface area of the housing while the first opposite ends of the elongated first member of the pivot member are maintained in engagement with the first spaced seating areas of the first surface area of the housing to bring second opposite ends of an elongated second member of an engagement member of the carriage assembly into alignment with second spaced seating areas of a second surface area of the housing;
and causing said second opposite ends of said elongated second member of said engagement member to engage and be supported by said second spaced seating areas of said second surface area of the housing, thereby permitting mounting of the carriage assembly to the housing with the first opposite ends of said elongated first member of said pivot member in engagement with the first spaced seating areas of the first surface area of the housing and the second opposite ends of said elongated second member of said engagement member in engagement with the second spaced seating areas of the second surface area of the housing.

* * * * *

UNITED STATES PATENT AND TRADEMARK OFFICE
CERTIFICATE OF CORRECTION

PATENT NO. : 5,394,209
DATED : February 28, 1995
INVENTOR(S) : Norbert M. Stiepel et al.

Page 1 of 2

It is certified that error appears in the above-indentified patent and that said Letters Patent is hereby corrected as shown below:

Col. 2, line 40. After "mounting" insert -- . --.

Col. 3, line 21. After "itself" insert -- to --.

Col. 3, line 24. After "about" insert -- the --.

Col. 5, line 55. After "undergo" insert -- a --.

Col. 6, line 65. After "while" insert -- the --.

Col. 9, line 49. After "to" insert -- the --.

Col. 10, line 26. Change "dome shaped" to -- dome-shaped --.

Col. 12, lines 48 and 56. Change "dome shaped" to -- dome-shaped --.

Col. 14, line 25. Change "pivotted" to -- pivoted --.

Col. 19, line . Change "Second" to -- second --.

Col. 20, line 55. Change "Of" to -- of --.

UNITED STATES PATENT AND TRADEMARK OFFICE
CERTIFICATE OF CORRECTION

PATENT NO. : 5,394,209
DATED : February 28, 1995
INVENTOR(S) : Norbert M. Stiepel et al.

It is certified that error appears in the above-indentified patent and that said Letters Patent is hereby corrected as shown below:

Col. 24, line 5.  Change "claim 73" to -- claim 74 --.

Signed and Sealed this

First Day of August, 1995

Attest:

BRUCE LEHMAN

Attesting Officer

Commissioner of Patents and Trademarks